United States Patent
Imamura

(10) Patent No.: US 9,376,138 B2
(45) Date of Patent: Jun. 28, 2016

(54) RACK SHAFT SUPPORTING APPARATUS AND STEERING APPARATUS FOR VEHICLE THEREWITH

(71) Applicant: JTEKT CORPORATION, Osaka-shi, Osaka (JP)

(72) Inventor: Naganori Imamura, Kashihara (JP)

(73) Assignee: JTEKT CORPORATION, Osaka-shi (JP)

( * ) Notice: Subject to any disclaimer, the term of this patent is extended or adjusted under 35 U.S.C. 154(b) by 525 days.

(21) Appl. No.: 13/827,428

(22) Filed: Mar. 14, 2013

(65) Prior Publication Data

US 2013/0247696 A1    Sep. 26, 2013

(30) Foreign Application Priority Data

Mar. 26, 2012  (JP) ................................ 2012-069715
Mar. 26, 2012  (JP) ................................ 2012-069716

(51) Int. Cl.
*B62D 3/12*      (2006.01)
*F16H 55/28*     (2006.01)

(52) U.S. Cl.
CPC .............. *B62D 3/123* (2013.01); *F16H 55/283* (2013.01); *Y10T 74/18096* (2015.01)

(58) Field of Classification Search
CPC .. B62D 3/123; F16H 55/283; Y10T 74/18096
See application file for complete search history.

(56) References Cited

U.S. PATENT DOCUMENTS

| | | | |
|---|---|---|---|
| 4,215,591 A | 8/1980 | Bishop | |
| 4,709,593 A | 12/1987 | Takeuchi | |
| 5,570,610 A * | 11/1996 | Cymbal | B62D 1/184 74/493 |
| 5,906,138 A * | 5/1999 | Kostrzewa | B62D 3/123 384/37 |
| 6,408,708 B1 * | 6/2002 | Sahr | B62D 3/123 180/428 |
| 7,487,984 B1 | 2/2009 | Lemont, Jr. et al. | |
| 7,930,951 B2 * | 4/2011 | Eickholt | B62D 3/123 74/388 PS |
| 8,256,315 B2 * | 9/2012 | Song | B62D 3/123 280/93.51 |
| 8,960,035 B2 * | 2/2015 | Nakamura | F16H 57/021 74/388 PS |
| 9,010,208 B2 * | 4/2015 | Urbach | F16H 55/283 29/897.2 |
| 2006/0185460 A1 | 8/2006 | Shiino et al. | |
| 2007/0209463 A1 * | 9/2007 | Song | B62D 3/123 74/388 PS |

(Continued)

FOREIGN PATENT DOCUMENTS

| | | |
|---|---|---|
| GB | 2174474 A | 11/1986 |
| JP | S58-110372 A | 6/1983 |

(Continued)

OTHER PUBLICATIONS

Oct. 25, 2013 Search Report issued in European Patent Application No. 13160303.7.

(Continued)

*Primary Examiner* — David M Fenstermacher
(74) *Attorney, Agent, or Firm* — Oliff PLC

(57) ABSTRACT

The rack shaft supporting apparatus includes a support yoke, a plug, a torsion spring or a spiral spring and a guide bush. A plug cam portion of the plug includes three plug cam surfaces. A yoke cam portion of the support yoke includes three yoke cam surfaces having a shape corresponding to that of the plug cam surfaces. The yoke cam surface contacts to the plug cam surface. The torsion spring or the spiral spring imparts force rotating the yoke cam portion against the plug cam portion to the support yoke. The guide bush includes a bush body and an arm portion. The bush body is fixed to the housing. The arm portion supports a side portion of the rack shaft.

11 Claims, 13 Drawing Sheets

(56) References Cited

U.S. PATENT DOCUMENTS

| | | | |
|---|---|---|---|
| 2009/0223314 A1 | 9/2009 | Eickholt | |
| 2010/0018337 A1 | 1/2010 | Kawakubo et al. | |
| 2010/0024583 A1* | 2/2010 | Kawakubo | B62D 3/123 74/422 |

FOREIGN PATENT DOCUMENTS

| | | |
|---|---|---|
| JP | H04-31079 A | 2/1992 |
| JP | H09-39805 A | 2/1997 |
| JP | A-2005-41251 | 2/2005 |
| JP | 2008-296899 A | 12/2008 |
| JP | 2010-023772 A | 2/2010 |
| JP | 2010-036610 A | 2/2010 |
| JP | 2010-058689 A | 3/2010 |

OTHER PUBLICATIONS

Jan. 5, 2016 Office Action issued in Japanese Patent Application No. 2012-069715.

Jan. 5, 2016 Office Action issued in Japanese Patent Application No. 2012-069716.

Mar. 1, 2016 Office Action issued in Chinese Patent Application No. 201310092378.4.

* cited by examiner

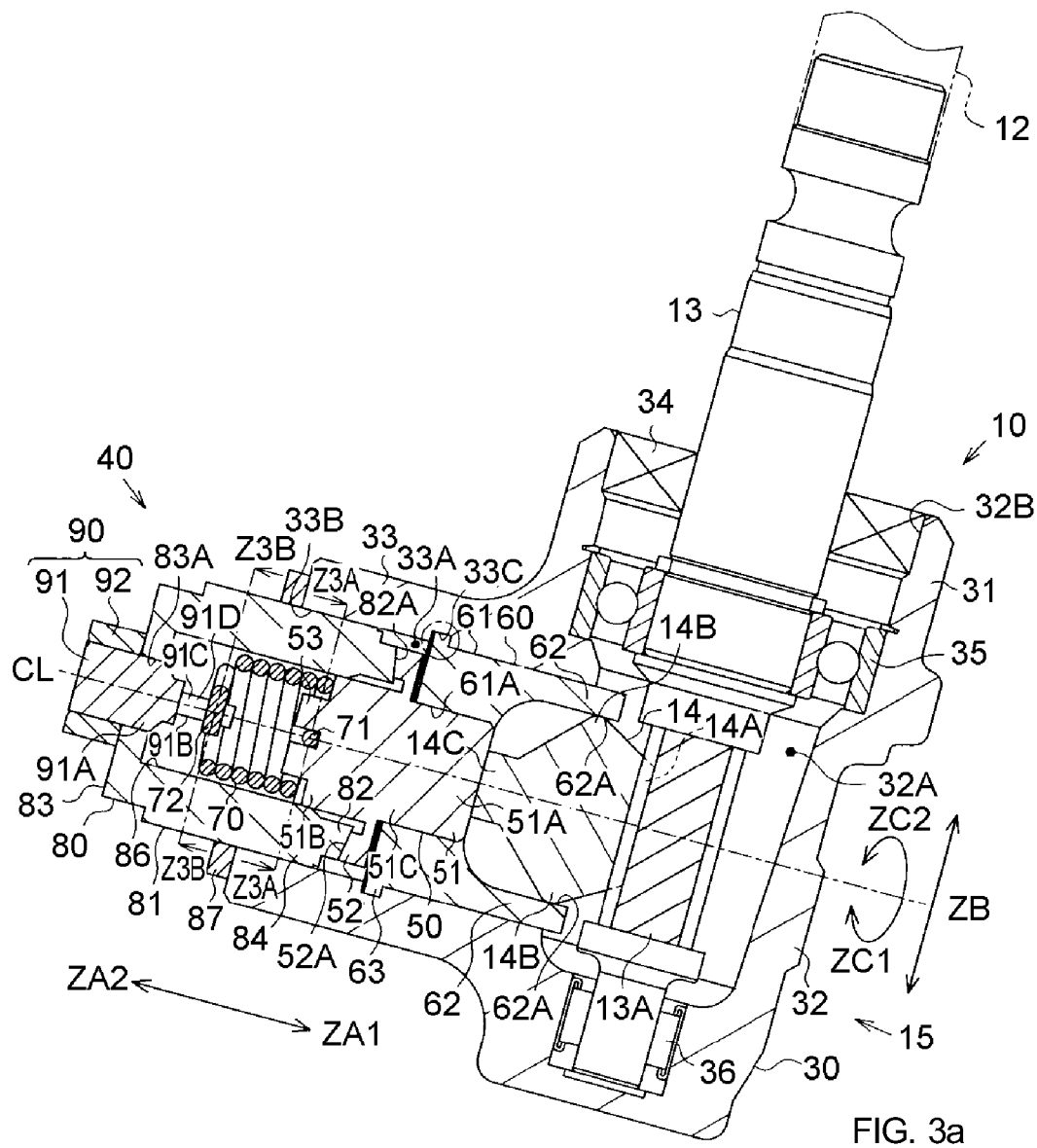
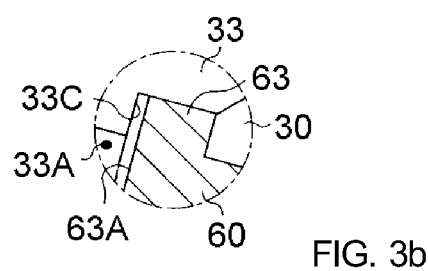
FIG. 3a
FIG. 3b

RACK SHAFT SUPPORTING APPARATUS AND STEERING APPARATUS FOR VEHICLE THEREWITH

INCORPORATION BY REFERENCE

The present application claims priority under 35 U.S.C. §119 to Japanese Patent Applications No. 2012-069715, filed on Mar. 26, 2012 and No. 2012-069716, filed on Mar. 26, 2012. The content of these applications are incorporated herein by reference in the entirety.

BACKGROUND OF THE INVENTION

1. Field of the Invention

The present invention relates to a rack shaft supporting apparatus supporting a rack shaft by a support yoke and a vehicle steering apparatus with the rack shaft supporting apparatus.

2. Description of the Related Art

It is well known in the prior art a vehicle steering apparatus in referring to FIG. 1 such as Japanese laid-open publication Tokkai 2005-41251.

The vehicle steering apparatus 900 includes a housing 901, a pinion shaft 902, a rack shaft 903, a rack and pinion mechanism 904 and a rack shaft supporting apparatus 910. The housing 901 accommodates a part of the pinion shaft 902, the rack shaft 903 and the rack shaft supporting apparatus 910. The rack and pinion mechanism 904 includes a pinion gear 902A of the pinion shaft 902 and a rack gear 903A of the rack shaft 903.

The rack shaft supporting apparatus includes a support yoke 911, a plug 912 and a coil spring 913. The plug 912 is fixed to the housing 901. The coil spring 913 imparts, to the support yoke 911, force pressing the support yoke 911 to the rack shaft 903.

The support yoke 911 includes a recess portion 911A having a shape corresponding to a shape of a back surface portion 903B of the rack shaft 903. The support yoke 911 includes a space 911B against the housing 901. The support yoke 911 supports the rack shaft 903 in a state that the rack shaft 901 is able to move along its axial direction.

In the rack shaft supporting apparatus 910, there is happened to create force rolling the rack shaft 903 along a longitudinal direction in accordance with rotation of the pinion shaft 902. The rolling is a rotational movement of a center axis of the rack shaft 903 along the longitudinal direction.

When the rack shaft 903 is rolled, the rack shaft 903 is received the force moving the rack shaft 903 against the pinion shaft 902 to a width direction of the rack shaft 903. As a result, the force along the width direction of the rack shaft 903 acts to the support yoke 911 supporting the back surface portion 903B of the rack shaft 903. Where an amount of the movement of the support yoke 911 is relatively large, there is created any contacting sound by contacting the support yoke 911 to the housing 901.

It is well known another prior art of a rack shaft supporting apparatus disclosed in U.S. Pat. No. 7,487,984 that a support yoke is pressed to a rack shaft through a rotating cam mechanism around a center axis of the support yoke by a torsion spring. In this another prior art, it happens the movement of the support yoke along a width direction of the rack shaft to create any contacting sound by contacting the support yoke to a housing.

SUMMARY OF THE INVENTION

In view of the previously mentioned circumstances, it is an object of the present invention to provide a rack shaft supporting apparatus to restrict any creation of a contacting sound between parts and to provide a vehicle steering apparatus having the rack shaft supporting apparatus.

In order to achieve the above and other objects, one aspect of the present invention provides a rack shaft supporting apparatus comprising a housing accommodating a rack shaft, a plug including a plug fixing portion fixed to the housing and a plug cam portion formed with a plug cam surface, a support yoke including a yoke body supporting a back surface portion of the rack shaft and a yoke cam portion formed with a yoke cam surface having a shape corresponding to a shape of the plug cam surface, said yoke cam surface is contacted to the plug cam surface, a spring member imparting force to rotate one of the yoke cam portion and the plug cam portion in relative to the other of the yoke cam portion and the plug cam portion, said force is imparted to one of the support yoke and the plug cam portion, and a guide bush mounted on the housing to support a side portion of the rack shaft.

Another aspect of the present invention provides a rack shaft supporting apparatus comprising, a housing accommodating a rack shaft, a plug including a plug fixing portion fixed to the housing and a plug cam portion formed with a plug cam surface, a support yoke including a yoke body supporting a back surface portion of the rack shaft and a yoke cam portion formed with a yoke cam surface having a shape corresponding to a shape of the plug cam surface, said yoke cam surface is contacted to the plug cam surface, a torsion spring imparting force to rotate the yoke cam portion against the plug cam portion, said force is imparted to the support yoke, and a guide bush mounted on the housing to support a side portion of the rack shaft.

Other aspect of the present invention provides a rack shaft supporting apparatus comprising a housing accommodating a rack shaft, a plug including a plug fixing portion fixed to the housing and a plug cam portion formed with a plug cam surface, said plug cam portion is rotatable against the plug fixing portion, a support yoke including a yoke body supporting a back surface portion of the rack shaft and a yoke cam portion formed with a yoke cam surface having a shape corresponding to a shape of the plug cam surface, said yoke cam surface is contacted to the plug cam surface, a torsion spring imparting force to rotate the plug cam portion against the yoke cam portion, said force is imparted to the plug cam portion, and a guide bush mounted on the housing to support a side portion of the rack shaft.

Fourth aspect of the present invention provides a rack shaft supporting apparatus comprising a housing accommodating a rack shaft, a plug including a plug fixing portion fixed to the housing and a plug cam portion formed with a plug cam surface, said plug cam portion is rotatable against the plug fixing portion, a support yoke including a yoke body supporting a back surface portion of the rack shaft and a yoke cam portion formed with a yoke cam surface having a shape corresponding to a shape of the plug cam surface, said yoke cam surface is contacted to the plug cam surface, a spiral spring imparting force to rotate the plug cam portion against the yoke cam portion, said force is imparted to the plug cam portion; and a guide bush mounted on the housing to support a side portion of the rack shaft.

Further other aspect of the present invention provides a rack shaft supporting apparatus comprising a housing accommodating a rack shaft, a plug including a plug fixing portion fixed to the housing and a plug cam portion formed with a plug cam surface, a support yoke including a yoke body supporting a back surface portion of the rack shaft and a yoke cam portion formed with a yoke cam surface having a shape corresponding to a shape of the plug cam surface, said yoke cam surface is contacted to the plug cam surface, a spiral spring imparting force to rotate the yoke cam portion against the plug cam portion, said force is imparted to the support yoke, and a guide bush mounted on the housing to support a side portion of the rack shaft.

In the rack shaft supporting apparatus of each of the above-mentioned four aspects according to the present invention, the guide bush supports the side portion of the rack shaft, therefore it restricts the movement of the rack shaft along the width direction of the rack shaft in accordance with rolling movement of the rack shaft. As a result, it restricts to create any contacting sound between the support yoke and the rack housing.

Further other aspect of the present invention according to one of above-mentioned four aspects provides a rack shaft supporting apparatus wherein said guide bush includes at least two arm portions supporting the side portions of the rack shaft along a width direction of the rack shaft, one of said arm portions supports one of the side portions of the rack shaft, and the other of said arm portions supports the other of the side portions of the rack shaft.

Further other aspect of the present invention according to one of above-mentioned four aspects provides a rack shaft supporting apparatus wherein said guide bush includes a bush body formed with said two arm portions as a whole, said bush body includes an inserted hole having a shape corresponding to a shape of the support yoke, and at least a part of said support yoke is inserted into the inserted hole.

In the rack shaft supporting apparatus of the last two mentioned aspects according to the present invention, since the guide bush is formed with two arm portions as a whole, it reduces a number of parts constructing the guide bush in comparison with a guide bush formed by individual separate part of the bush body and two arm portions.

Further other aspect of the present invention according to the last above-mentioned aspect provides a rack shaft supporting apparatus wherein said rack shaft supporting apparatus includes an elastic member pushing the support yoke to the rack shaft.

In the rack shaft supporting apparatus of the last mentioned aspect according to the present invention, since the support yoke is pressed to the rack shaft by the elastic member, it reduces a gear beating sound between the rack shaft and the pinion shaft.

Further other aspect of the present invention provides a vehicle steering apparatus comprising the rack shaft, the housing, and said rack shaft supporting apparatus according to one of above-mentioned aspects.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which:

FIG. 3a and FIG. 3b are cross-sectional diagrams of the rack shaft supporting apparatus of the first embodiment, FIG. 3a is a cross-sectional diagram showing a cross-sectional construction at a plane parallel to a central axis of the pinion shaft and transverse to a central axis of the rack shaft, FIG. 3b is an enlarged view of a construction circled by a long dotted short dotted line in FIG. 3a;

FIG. 5a is a cross-sectional diagram showing a cross-sectional construction by Z3A-Z3A plane in FIG. 3a, and FIG. 5b is a cross-sectional diagram showing a cross-sectional construction by Z3B-Z3B plane in FIG. 3a;

FIG. 6a is a partial cross-sectional diagram of the support yoke and its peripheral parts at a beginning state of a wear, and FIG. 6b is a partial cross-sectional diagram of the support yoke and its peripheral parts at a progressive state of the wear;

FIG. 7a is a cross-sectional diagram showing a cross-sectional construction at a plane parallel to a central axis of the pinion shaft and transverse to a central axis of the rack shaft, FIG. 7b is a cross-sectional diagram showing a cross-sectional construction by Z6-Z6 plane in FIG. 7a;

FIG. 8a is a cross-sectional diagram showing a cross-sectional construction at a plane parallel to a central axis of the pinion shaft and transverse to a central axis of the rack shaft, FIG. 8b is a cross-sectional diagram showing a cross-sectional construction by Z7-Z7 plane in FIG. 8a;

FIG. 9a is a cross-sectional diagram showing a cross-sectional construction at a plane parallel to a central axis of the pinion shaft and transverse to a central axis of the rack shaft, FIG. 9b is a cross-sectional diagram showing a cross-sectional construction by Z9-Z9 plane in FIG. 9a, and FIG. 9c is an enlarged view of a construction circled by a long dotted short dotted line in FIG. 9a;

FIG. 11a is a cross-sectional diagram showing a cross-sectional construction at a plane parallel to a central axis of the pinion shaft and transverse to a central axis of the rack shaft, FIG. 11b is a cross-sectional diagram showing a cross-sectional construction by Z11-Z11 plane in FIG. 11a;

DETAILED DESCRIPTION OF THE PREFERRED EMBODIMENTS

First Embodiment

Figure 2:
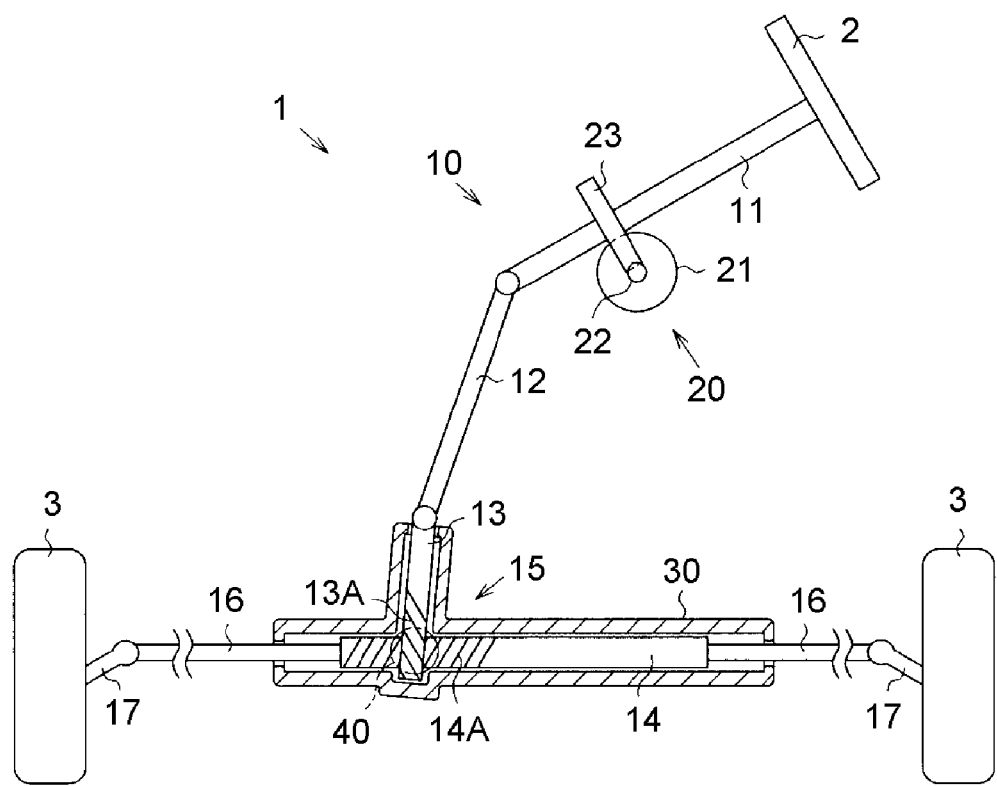
FIG. 2 is a schematic diagram of the vehicle steering apparatus of first embodiment according to the present invention.

A steering apparatus 1 for a vehicle will be explained hereinafter in referring to FIG. 2. A center axis of a pinion shaft 13 is a rotational center axis for a self rotation of the pinion shaft 13. A center axis of a rack shaft 14 is a center axis along which the rack shaft 14 is moved.

The steering apparatus 1 includes a steering apparatus body 10, an assisting device 20, a housing 30 and a rack shaft supporting apparatus 40. The steering apparatus 1 is constructed as an electrical power steering apparatus assisting an operation of a steering wheel 2 by the assisting device 20.

The steering apparatus body 10 includes a column shaft 11, an intermediate shaft 12, the pinion shaft 13, the rack shaft 14, a rack and pinion mechanism 15, tie-rods 16 and knuckles 17. The steering apparatus body 10 changes a steering angle of steered wheels 3 in accordance with a change of steering angle of the steering wheel 2.

The rack and pinion mechanism 15 includes a pinion gear 13A of the pinion shaft 13 and a rack gear 14a of the rack shaft 14. The pinion gear 13A equips with a flank line inclined to the center axis of the pinion shaft 13. The rack gear 14A equips with a flank line inclined to the center axis of the rack shaft 14. The rack gear 14A engages in mesh with the pinion gear 13A.

The assisting device 20 includes an assisting motor 21, a worm shaft 22 and a worm wheel 23. The assisting motor 21 is connected with the worm shaft 22. The worm shaft 22 is engaged in mesh with the worm wheel 23. The worm wheel 23 is fixed to the column shaft 11.

A construction inside the housing 30 will be explained in referring to FIG. 3a and FIG. 3b. A direction of an arrow ZA1 is a pressing direction along to a center line CL of a yoke accommodating portion 33 and shows a direction passing through a support yoke 50 and the rack shaft 14 in order. A direction of an arrow ZA2 is a counter pressing direction along to the center line CL of the yoke accommodating portion 33 and a counter direction to the pressing direction ZA1. A direction of an arrow ZB is a rack width direction being transverse to the center axis of the rack shaft 14 and parallel to the center axis of the pinion shaft 13.

The housing 30 includes a housing body 31, an oil seal 34, a ball bearing 35 and a needle bearing 36. The housing 30 is a construction having the oil seal 34, the ball bearing 35 and the needle bearing 36 inside a shaft accommodating portion 32 of the housing body 31.

The housing body 31 is made of a metal material. The housing body 31 includes the shaft accommodating portion 32 and a yoke accommodating portion 33. The housing body 31 is a construction forming the shaft accommodating portion 32 and the yoke accommodating portion 33 by the same metal material as a whole.

The shaft accommodating portion 32 includes an accommodating space 32A and an opening portion 32B. The shaft accommodating portion 32 accommodates a lower end portion of the pinion shaft 13 and a whole portion of the rack shaft 14 as shown in FIG. 2. The shaft accommodating portion 32 seals a clearance to the pinion shaft 13 by the oil seal 34 at the opening portion 32B. The shaft accommodating portion 32 supports a portion of the pinion shaft 13 between the pinion gear 13A and a sealed portion by the oil seal 34 by the ball bearing 35. The shaft accommodating portion 32 supports a top end portion of the pinion shaft 13 by the needle bearing 36.

The yoke accommodating portion 33 includes an accommodating space 33A, an opening portion 33B and a groove portion 33C. The yoke accommodating portion 33 accommodates the rack shaft supporting apparatus 40 in the accommodating space 33A. The yoke accommodating portion 33 is continuously constructed with shaft accommodating portion 32.

The accommodating space 33A is formed as a cylindrical space being able to accommodate a guiding bush 60 of the rack shaft supporting apparatus 40 and a plug 80. The accommodating space 33A has a center line CL shown by a long dashed short dashed line in FIG. 3a.

The groove portion 33C is an annular shape corresponding to a shape of a flange 63 of the guide bush 60. The groove portion 33C has a width larger than a thickness of the flange 63.

The rack shaft supporting apparatus 40 includes the support yoke 50, the guide bush 60, a torsion spring 70, the plug 80 and a spring adjusting mechanism 90. The rack shaft supporting apparatus 40 pushes the support yoke 50 against a back surface portion 14C of the rack shaft 14 by the torsion spring 70 and the plug 80.

A construction of an aspect portion of the present invention will be explained in referring to FIG. 4. A rotational direction of an arrow ZC1 is a direction of the torsion spring 70 reducing an amount of torsion. A counter rotational direction of an arrow ZC2 is a direction increasing an amount of the torsion.

The support yoke 50 is made of a metal material. The support yoke 50 includes a yoke body 51, a yoke cam portion 52 and a spring connecting portion 53. The support yoke 50 is a construction forming the yoke body 51, the yoke cam portion 52 and the spring connecting portion 53 by the same metal material as a whole.

The yoke body 51 is a cylindrical column shape. The yoke body 51 is inserted into an inserting hole 61A of the guide bush 60. The yoke body 51 contacts with an inner surface of the bush body 61 at an outer peripheral surface of the yoke body 51. The yoke body 51 includes a first yoke end portion 51A, a second yoke end portion 51B and a yoke intermediate portion 51C. The yoke body 51 supports a back surface portion of the rack shaft 14 at the first yoke end portion 51A as shown in FIG. 3a.

The yoke cam portion 52 is an annular shape. The yoke cam portion 52 is formed on an outer peripheral surface of the yoke intermediate portion 51C. The yoke cam portion 52 includes three of yoke cam surfaces 52A, three of cam recess portions 52B, one inserted hole 52C at a yoke side and one inner peripheral groove 52D. The yoke cam portion 52 has the inner peripheral groove 52D between the yoke body 51 and each of the yoke cam portions 52A.

Each of the yoke cam surfaces 52A is formed at same distance each other around the center axis of the yoke body 51. Each of the yoke cam surfaces 52A inclines from the counter pressing direction ZA2 toward the pressing direction ZA1 in accordance with approaching from the counter rotating direction ZC2 to the rotating direction ZC1.

Each of the cam recess portions 52B is formed on the surface between each of the adjacent yoke cam surfaces 52A around the center axis of the yoke body 51. Each of the cam recess portions 52B connects one end portion of one yoke cam surface 52A with the other end of the adjacent other yoke cam surface 52A.

The inserted hole 52C at the yoke side is formed at one of the cam recess portions 52B. The inserted hole 52C at the yoke side penetrates through the one cam recess portion 52B along the center axis of the yoke body 51. The inserted hole 52C at the yoke side has a diameter corresponding to that of an inserted hole 85 of the plug 80.

The spring connecting portion 53 includes two connecting protrusion portions 53A and a single attaching groove 53B. Each of the connecting protrusion portions 53A is formed on an end surface of the second yoke end portion 51B. The attaching groove 53B is formed between the one connecting protrusion portion 53A and the other connecting protrusion portion 53A.

The guide bush 60 is made of a resin material. The guide bush 60 includes a bush body 61, two arm portions 62 and a flange 63. The guide bush 60 is a construction made of the bush body 61, the two arm portions 62 and the flange 63 by same resin material as a whole. The two arm portions 62 are protruded to substantial length to support and guide a side portion 14B of the rack shaft 14 along the center line CL direction as explained hereinafter. By this construction, the guide bush 60 restricts the rack shaft 14 from moving along the rack width direction ZB.

The bush body 61 is a hollow cylindrical shape. The bush body 61 is accommodated in the accommodating space 33A of the yoke accommodating portion 33 as shown in FIG. 3a. An outer peripheral surface of the bush body 61 is contacted with an inner peripheral surface of the yoke accommodating portion 33 as shown in FIG. 3a. The bush body 61 has an inserted hole 61A.

The inserted hole 61A is circular shape corresponded to the peripheral shape of the yoke body 51. The inserted hole 61A is penetrated through the bush body 61 along the center axis direction of the bush body 61. The inner peripheral surface of the inserted hole 61A contacts with the outer peripheral surface of the yoke body 51 as shown in FIG. 3a.

Each of the arm portions 62 is a peace of a rectangular shape. Each of the arm portions 62 is protruded from an end portion of the bush body 61 at a rack shaft side. Each of the arm portions 62 has a supporting surface 62A being shaped to a plane. The supporting surface 62A of each arm portion 62 supports each of side portions of the rack shaft 14 as shown in FIG. 3a.

The plug 80 includes a plug body 81 and a plug lock nut 87 each of which is made as a different individual part. The plug 80 is fixed to the yoke accommodating portion 33 as shown in FIG. 3a. The plug 80 holds the torsion spring 70 through the spring adjusting mechanism 90. The plug 80 closes the opening portion 33B of the yoke accommodating portion 33 by the plug body 81 as shown in FIG. 3a.

The plug body 81 is made of a metal material. The plug body 81 is a cylindrical shape. The plug body 81 includes a plug cam portion 82, a plug top portion 83, a plug fixing portion 84, an inserted hole 85 and an accommodating space 86. The plug body 81 is constructed by the plug cam portion 82, the plug top portion 83 and the plug fixing portion 84 by a same metal material as a whole. The plug body 81 accommodates the torsion spring 70 in the accommodating space 86 as shown in FIG. 3a.

The plug cam portion 82 is a cylindrically annular shape. The plug cam portion 82 is installed in the accommodating space 33A of the yoke accommodating portion 33 as shown in FIG. 3a. The plug cam portion 82 is formed at an end portion of the plug fixing portion 84. The plug cam portion 82 has three plug cam surfaces 82A and three cam intersecting portions 82B.

Each of the plug cam surfaces 82A is formed with same interval space with each other around a center axis of the plug body 81. Each of the plug cam surfaces 82A faces to and contacts with each of the yoke cam surfaces 52A as shown in FIG. 3a. Each of the plug cam surfaces 82A inclines from the counter pressing direction ZA2 toward the pressing direction ZA1 in accordance with approaching from the counter rotating direction ZC2 to the rotating direction ZC1.

Each of the cam intersecting portions 82B is formed on the surface between one plug cam surface 82A and the adjacent plug cam surface 82A around the center axis of the plug body 81. Each of the cam intersecting portions 82B connects one end portion of one plug cam surface 82A with the other end of the adjacent other plug cam surface 82A.

The plug top portion 83 is formed at an end portion of the plug fixed portion 84. The plug top portion 83 includes an adjusting bolt hole 83A. The plug top portion 83 has at an inner peripheral surface of the adjusting bolt hole 83A an un-illustrated female screw corresponding to a male screw of an adjusting bolt 91. The plug top portion 83 closes one side of an opening portion of the plug fixed portion 84. The plug top portion 83 hold the adjusting bolt 91 at the adjusting bolt hole 83A as shown in FIG. 3a.

The plug fixed portion 84 has at its outer peripheral surface a male screw corresponding to a female screw of the yoke accommodating portion 33 and a female screw of the plug lock nut 87. One portion of the plug fixed portion 84 is disposed in the accommodating space 33A and the other portion is protruded out from the housing 30 as shown in FIG. 3a. The plug fixed portion 84 fixes the plug body 81 to the housing 30 by making its male screw into the yoke accommodating portion 33 as shown in FIG. 3a.

An inserted hole 85 at the plug side is formed at one of the cam intersecting portion 82B. The inserted hole 85 penetrates into the cam intersecting portions 82B, the plug top portion 83 and the plug fixed portion 84 along the center axis direction of the plug body 81.

A plug lock nut 87 is made of a metal material. The plug lock nut 87 is engaged in mesh with a male portion of the plug fixed portion 84. The plug lock nut 87 contacts with an end surface of the opening portion 33B of the yoke accommodating portion 33 out of the housing 30 as shown in FIG. 3a. The plug lock nut 87 restricts the plug body 81 from loosing against the housing 30.

Figure 5A:
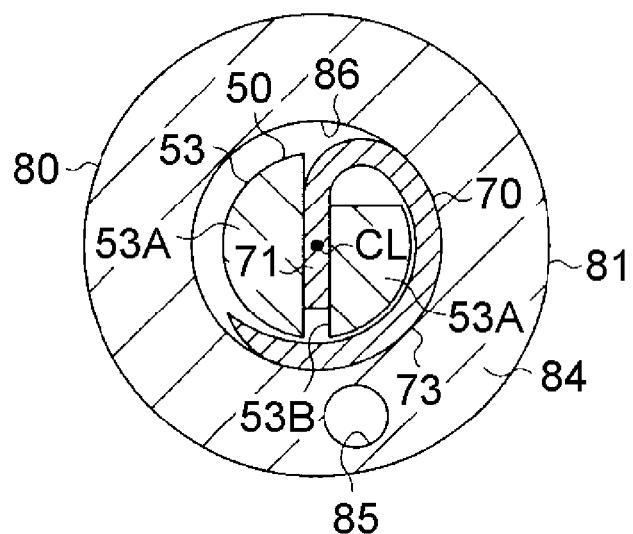
FIG. 5a and FIG. 5b are cross-sectional diagrams of the rack shaft supporting apparatus of the first embodiment.
Figure 5B:
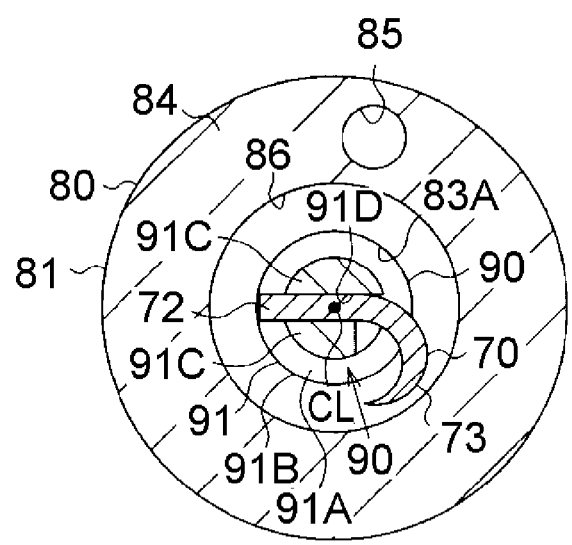

The torsion spring 70 is made of a metal material. The torsion spring 70 includes a spring end portion 71 at a yoke side, a spring end portion 72 at a plug side and a spring winding portion 73. The torsion spring 70 has a construction made of the spring end portion 71 at the yoke side, the spring end portion 72 at the plug side and the spring winding portion 73 by the same metal material as a whole. The torsion spring 70 is inserted into the attaching groove 53B of the spring connecting portion 53 at the spring end portion 71 at the yoke side as shown in FIG. 5a. The torsion spring 70 is inserted into an attaching groove 91D of a spring connecting portion 91B at the spring end portion 72 at the plug side as shown in FIG. 5b. The torsion spring 70 imparts to the support yoke 50 the force rotating the support yoke 50 against the plug 80.

The spring adjusting mechanism 90 includes an adjusting bolt 91 and a lock nut 92 each of which is made as an individual part. The spring adjusting mechanism 90 changes a torsion amount of the torsion spring 70 by rotating the adjusting bolt 91. The spring adjusting mechanism 90 restricts the adjusting bolt 91 from loosing against the plug 80 by the lock nut 92.

The adjusting bolt 91 is made of a metal material. The adjusting bolt 91 includes a bolt body 91A and a spring connecting portion 91B. The adjusting bolt 91 has a construction made by a same metal material of the bolt body 91A and the spring connecting portion 91B as a whole. The adjusting bolt 91 adjusts a torsion amount of the torsion spring 70.

The bolt body 91A is a cylindrical shape. The bolt body 91A includes a male screw corresponding to both of a female screw of the adjusting bolt hole 83A of the plug 80 and a female screw of the lock nut 92. The male and female screws are not illustrated. The bolt body 91A is screwed into the adjusting bolt hole 83A as shown in FIG. 3a.

The spring connecting portion 91B includes two connecting protrusion portions 91C and one attaching groove 91D. The spring connecting portion 91B has each of connecting protrusion portions 91C on an end surface of the bolt body 91A. The spring connecting portion 91B includes the attaching groove 91D between one and the other connecting protrusion portions 91C.

The lock nut 92 is made of a metal material. The lock nut 92 includes an un-illustrated female screw corresponding to a male screw of the bolt body 91A. The lock nut 92 restricts the adjusting bolt 91 from loosing against the adjusting bolt hole 83A.

Figure 4:
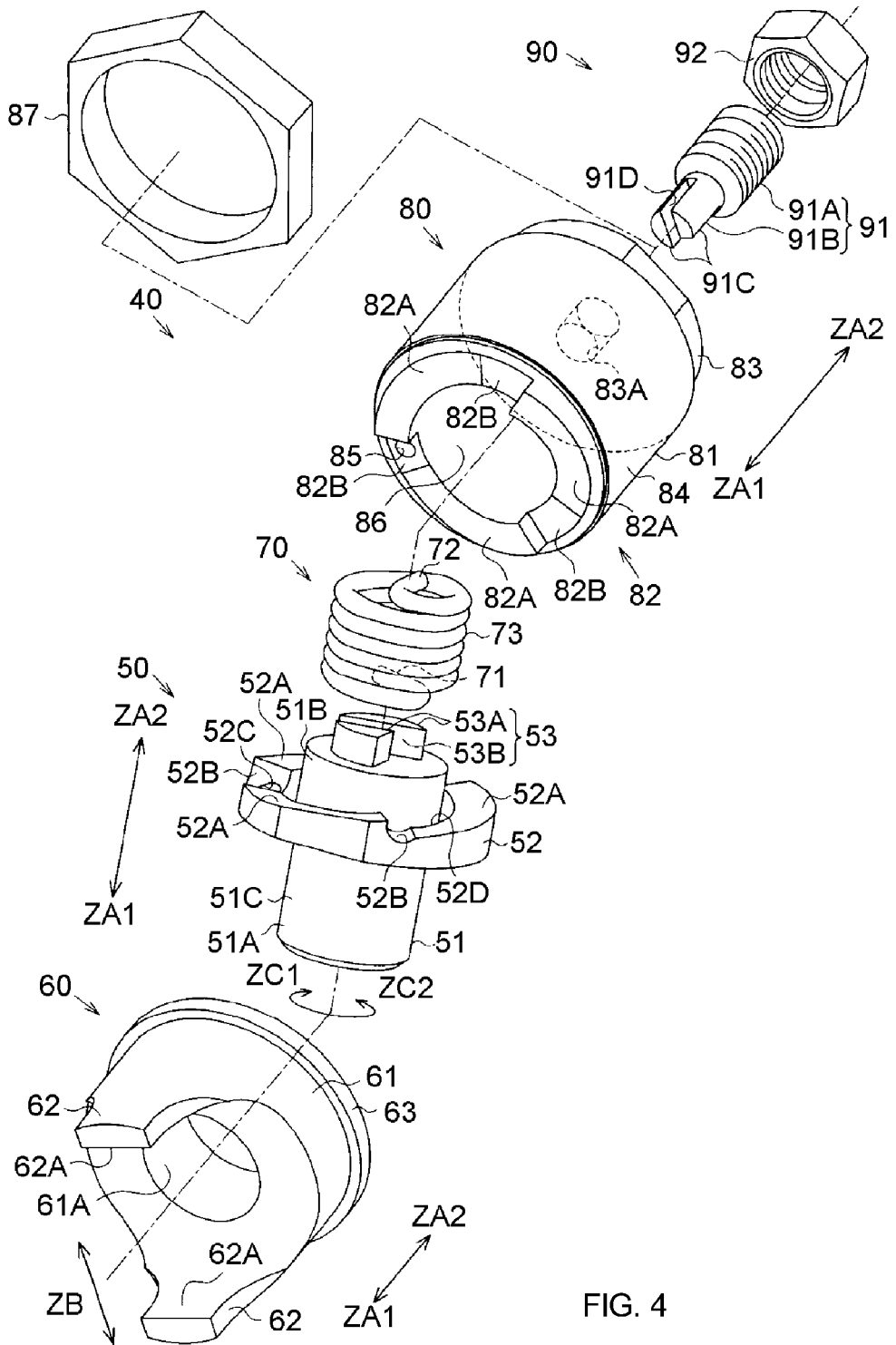
FIG. 4 is a disassembling structural diagram of the rack shaft supporting apparatus of the first embodiment.

It is explained here an operation of adjusting the torsion amount of the torsion spring 70 in referring to FIG. 3a, FIG. 3b and FIG. 4.

An operator assembles the rack shaft supporting apparatus 40 (referred as a "pre-adjusted unit") in a process prior to an adjusting process of the torsion amount. Besides, the pre-adjusted unit has a construction eliminated the guide bush 60, the plug lock nut 87 and the lock nut 92 from the rack shaft supporting apparatus 40 shown in FIG. 3a. The pre-adjusted unit includes the inserted hole 85 of the plug 80 and the inserted hole 52C of the support yoke 50 in coaxial.

In first adjusting process, the operator inserts one un-illustrated temporary lock bolt into the inserted hole 85 at the plug side and the inserted hole 52C at the yoke side in the pre-adjusting unit in referring to FIG. 4. The temporary lock bolt locks a relative rotational phase of the plug 80 and the support yoke 50.

In second adjusting process, the operator locks the plug 80 and the support yoke 50 in referring to FIG. 4. Next the operator rotates the adjusting bolt 91 to the counter rotational direction ZC2 until the rotational amount of the adjusting bolt 91 in the counter direction ZC2 reaches to the predetermined rotational amount. As a result the adjusting bolt 91 twists the torsion spring 70 by rotating the spring end portion 72 at the plug side to the counter rotational direction ZC2.

In third adjusting process, the operator screws the lock nut 92 into the bolt body 91A of the adjusting bolt 91 until an amount of the securing torque of the lock nut 92 reaches to the predetermined amount in referring to FIG. 3a. The lock nut 92 restricts the adjusting bolt 91 from rotating to the rotational direction ZC1 against the plug 80. Besides, the temporary lock bolt is removed from the plug 80 and the support yoke 50 after the lock nut is locked. An opened end of the inserted hole 85 at the plug side is closed by an un-illustrated plug after the temporary lock bolt is removed.

Figure 6A:
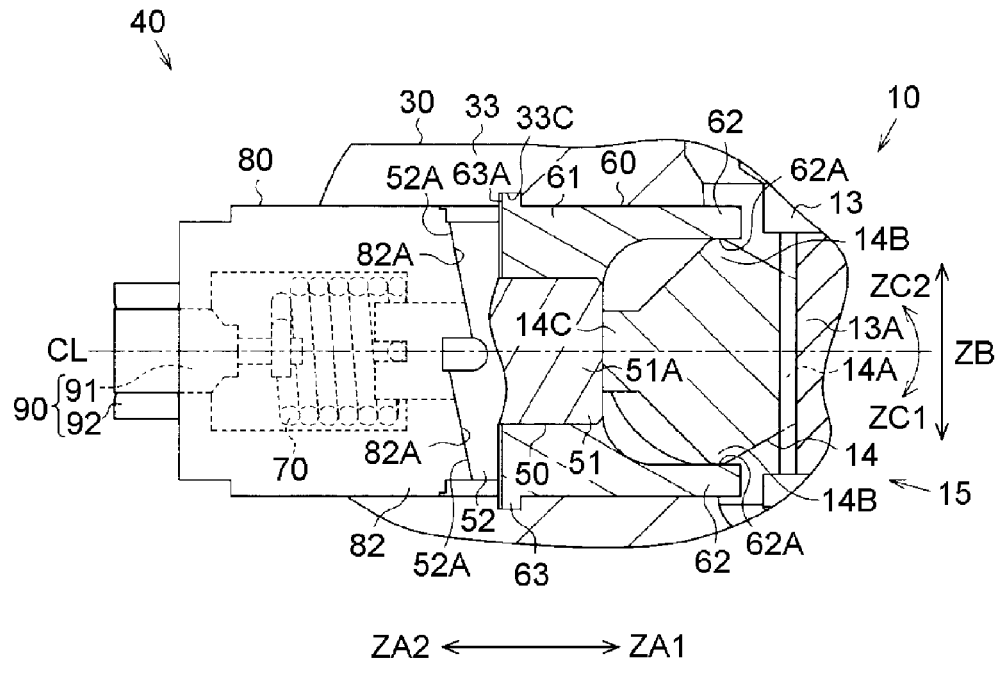
FIG. 6a and FIG. 6b are cross-sectional diagrams of the rack shaft supporting apparatus of the first embodiment.
Figure 6B:
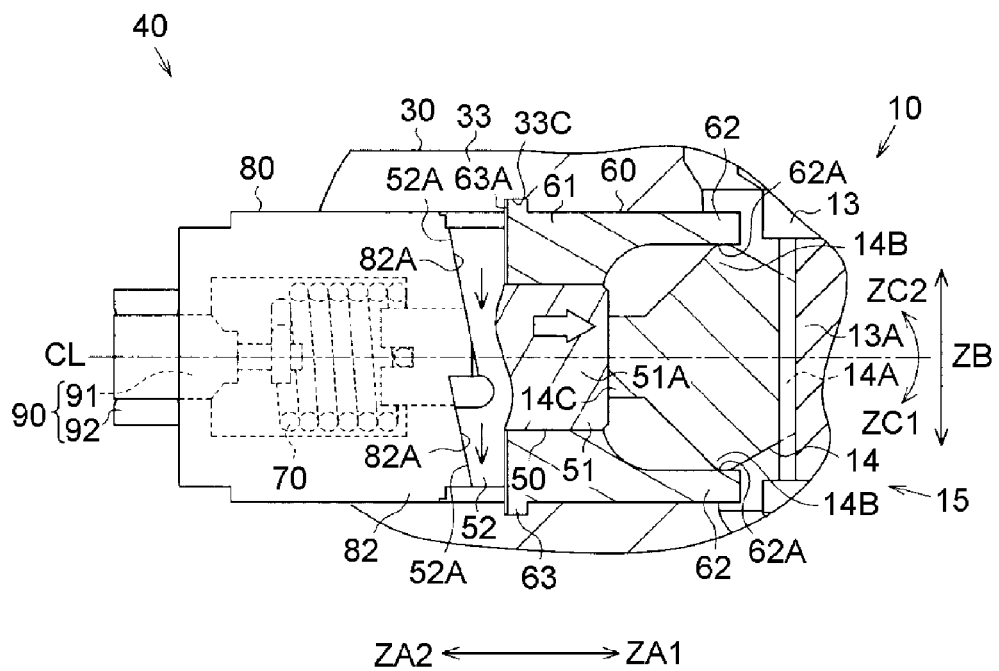

It is explained here an operation of the rack shaft supporting apparatus 40 in referring to FIG. 6a and FIG. 6b.

FIG. 6a shows a beginning stage of wear of the vehicle steering apparatus 1. FIG. 6b shows a progressing stage of the wear of the vehicle steering apparatus 1. The beginning stage of the wear shows a stage where the wear is not generated in a friction portion of the rack shaft 14. The progressing stage shows a stage where the wear is appeared in the friction portion of the rack shaft 14. The friction portion of the rack shaft 14 includes an engaging portion between the rack gear 14A and the pinion gear 13A, and contacting portions between the back surface portion 14C and the yoke body 51.

The rack shaft supporting apparatus 40 has first function to fourth function. The first function is to show function restricting the rack shaft 14 from moving to the counter pressing direction ZA2 against the pinion shaft 13. The second function is to show function restricting an increase of clearance in the engaging portion between the rack gear 14A and the pinion gear 13A on a basis of the progressing of the wear in the friction portion of the rack shaft 14. The third function is to show function restricting the rack shaft 14 from moving to the rack width direction ZB against the pinion shaft 13. The fourth function is to show function restricting the side portions 14B of the rack shaft 14 from wearing.

Next a detail of the first function of the rack shaft supporting apparatus 40 will be explained hereinafter.

The support yoke 50 is restricted from moving to the counter pressing direction ZA2 against the plug 80 by contacting the yoke cam surface 52A with the plug cam surface 82A. The first yoke end portion 51A contacts with the back surface portion 14C of the rack shaft 14. Therefore, the rack shaft 14 is restricted from moving to the counter pressing direction ZA2 against the pinion shaft 13.

A detail of the second function of the rack shaft supporting apparatus 40 will be explained hereinafter.

The torsion spring 70 is to impart to the support yoke 50 the force rotating the support yoke 50 to the rotating direction ZC1. The force acts to the support yoke 50 to rotate the yoke cam surface 52A against the plug cam surface 82A to the rotating direction ZC1. On the other hand, the support yoke 50 is restricted from moving to the pressing direction ZA1 against the plug 80 by contacting with the back surface portion 14C of the rack shaft 14. Therefore, the support yoke 50 is sandwiched between the plug 80 and the rack shaft 14 in a stage acted the force to the pressing direction ZA1 generated by the rotational force imparted from the torsion spring 70.

Therefore, in accordance with an increase of the amount of wear, the yoke cam surface 52A rotates against the plug cam surface 82A and the support yoke 50 moves to the pressing direction ZA1 against the plug 80 in transition from the beginning stage of the wear in FIG. 6a to the progressive stage of the wear in FIG. 6b of the vehicle steering apparatus 1. As a result, the back surface portion 14C of the rack shaft 14 is still supported by the first yoke end portion 51A even though the wear amount of the friction portion of the rack shaft 14 increases.

A detail of the third function of the rack shaft supporting apparatus 40 will be explained hereinafter.

The rack shaft 14 rolls in accordance with the rotation of the pinion shaft 13. The rack shaft 14 receives the force moving the rack shaft 14 to the rack width direction ZB at a gear engaging portion of the rack and pinion mechanism 15 during the rolling movement of the rack shaft 14. Therefore, the force to the rack width direction ZB against the support yoke 50 supporting the back surface portion 14C of the rack shaft 14.

Each of the side portions 14B of the rack shaft 14 is supported by each of the arm portions 62 of the guide bush 60. Therefore, it is restricted that the rack shaft 14 moves to the rack width direction ZB against the pinion shaft 13. The yoke body 51 of the support yoke 50 is supported by the bush body 61 of the guide bush 60. Therefore, it is restricted that the support yoke 50 contacts with the housing 30.

A detail of the fourth function of the rack shaft supporting apparatus 40 will be explained hereinafter.

The guide bush 60 has the clearance between the end face 63A of the flange 63 and the groove portion 33C of the yoke accommodating portion 33. Therefore, the guide bush 60 can move to counter pressing direction ZA2 against the yoke accommodating portion 33 when the force to the counter pressing direction ZA2 acts to the guide bush 60. On the other hand, the rack shaft 14 can move to counter pressing direction ZA2 against the housing 30 when the force to the counter pressing direction ZA2 acts to the rack shaft 14.

The guide bush 60 moves to the counter pressing direction ZA2 with the rack shaft 14 in accordance with the clearance between the flange 63 and the groove portion 33C because each of the arm portions 62 contacts with each of the side portions 14B of the rack shaft 14. As a result for the present invention, there is little possibility of the relative movement of the each side portion 14B and the each arm portion 62 in comparison with an assumed construction without any clearance between the flange 63 and the groove portion 33C. Therefore, it restricts the generation of the wear by contacting each side portion 14B to each arm portion 62.

The present invention according to the first embodiment has next effects.

1. The rack shaft supporting apparatus 40 has the guide bush 60 supporting the side portion 14B of the rack shaft 14 to perform the third function. The movement of the rack shaft 14 to the rack width direction ZB is restricted by the construction of the first embodiment. Therefore, any generation of the contacting sound of the support yoke 50 to the housing 30 is restricted.

2. The rack shaft supporting apparatus 40 includes the support yoke 50 of the construction formed with the yoke body 51 and the yoke cam portion 52 as a whole, and the torsion spring 70 imparting the rotational force to the support yoke 50. By these constructions, the rotational force of the torsion spring 70 is stably acted to the yoke body 51 in comparison with a construction of individual parts of the yoke body 51 to the yoke cam portion 52. Therefore, the rack shaft 14 is pressed to the pinion shaft 13 stably by the yoke body 51.

3. The rack shaft supporting apparatus 40 includes the yoke cam portion 52, the plug cam portion 82 and the torsion spring 70. By the constructions, the force rotating the yoke cam surface 52A to the rotating direction ZC1 against the plug cam surface 82A imparts to the support yoke 50 by the torsion spring 70. As a result, the support yoke 50 moves to the pressing direction ZA1 against the plug 80 by the rotation of the plug cam surface 82A against the yoke cam surface 52A in accordance with the increase of the wear amount of the friction portion of the rack shaft 14. Therefore, the back surface portion 14C is still supported by the first yoke end portion 51A even though the wear amount of the friction portion of the rack shaft 14 increases.

4. The rack supporting apparatus 40 includes the guide bush 60 having the construction formed with the bush body 61 and two arm portions 62 as a whole. By this construction it can reduce a part number for the guide bush 60 in comparison with a construction formed with the bush body 61 and two arm portions 62 by individual parts.

5. The rack shaft supporting apparatus 40 has the clearance between the end surface 63A of the flange 63 and the groove portion 33C of the yoke accommodating portion 33. By this construction there is a low possibility of the relative movement of each side portion 14B of the rack shaft 14 and each arm portion 62 in comparison with the assumed construction having no clearance between the flange 63 and the groove portion 33C.

Second Embodiment

Figure 7A:
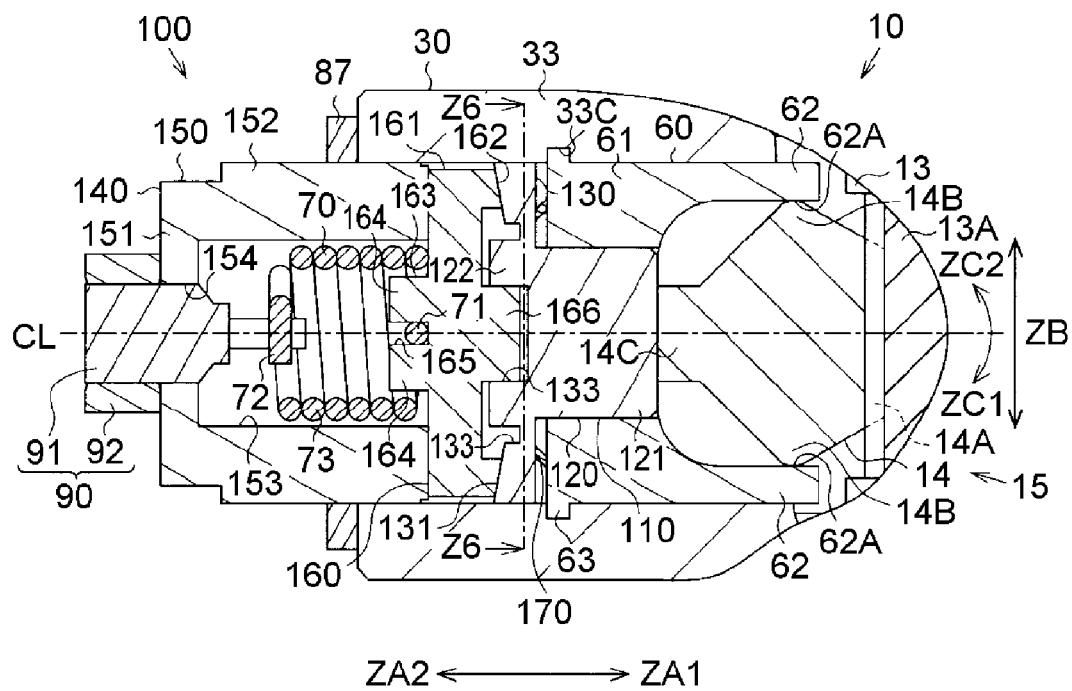
FIG. 7a and FIG. 7b are cross-sectional diagrams of the rack shaft supporting apparatus of the second embodiment.
Figure 7B:
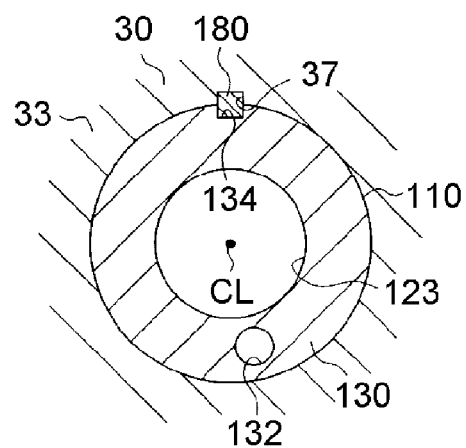

FIG. 7a and FIG. 7b show a rack shaft supporting apparatus 100 of the second embodiment according to the present invention.

The rack shaft supporting apparatus 100 according to the second embodiment has next different constructions compared to the rack shaft supporting apparatus 40 in FIG. 3a and same constructions to other remaining constructions. The rack shaft supporting apparatus 100 includes a support yoke 110 instead of the support yoke 50, a plug 140 instead of the plug 80, a disk spring 170 and a detent pin 180. Constructional elements defined with explanations of correspondence to constructional elements in the first embodiment have same or similar function to that of the first embodiment.

It is explained here the detail constructions different from that of the rack shaft supporting apparatus 40 of the first embodiment. Therefore, a part or all common constructions to the vehicle steering apparatus 1 of the first embodiment have same numerals with the first embodiment and are not explained.

The support yoke 110 is made of a metal material. The support yoke 110 has a construction without the spring connecting portion 53 from the support yoke 50. The support yoke 110 includes a yoke body 120 and a yoke cam portion 130. The support yoke 110 has a construction formed with the yoke body 120 and the yoke cam portion 130 by the same metal material as a whole.

The housing 30 includes a pin fixing hole 37 at the yoke accommodating portion 33 shown in FIG. 7b. The housing 30 forms a space fixing a detent pin 180 by aligning the pin fixing hole 37 to a pin fixing hole 134 of the support yoke 110 as shown in FIG. 7b.

The detent pin 180 is made of a metal material. The detent pin 180 is installed in the space over the pin fixing hole 37 and the pin fixing hole 134. The detent pin 180 restricts a rotation of the support yoke 110 against the housing 30.

The disk spring 170 is made of a metal material. The disk spring 170 is inserted between the yoke cam portion 130 and the guide bush 60. The disk spring 170 presses the yoke cam portion 130 against a plug cam portion 161 to maintain the contact of a yoke cam surface 131 of the yoke cam portion 130 with a plug cam surface 162 of the plug cam portion 161.

The yoke body 120 includes a first yoke end portion 121 corresponding to the first yoke end portion 51A in the first embodiment and a second yoke end portion 122 corresponding to the second yoke end portion 51B in the first embodiment. The yoke body 120 has an inserted hole 123 opening to a side of the plug 140 at the second yoke end portion 122.

The yoke cam portion 130 includes the yoke cam surface 131 corresponding to the yoke cam surface 52A in the first embodiment, an un-illustrated cam recess portions corresponding to the cam recess portions 52B in the first embodiment, an inserted hole 132 at a yoke side shown in FIG. 7b corresponding to the inserted hole 52C at the yoke side in the first embodiment, an inner peripheral groove 133 corresponding to the inner peripheral groove 52D in the first embodiment, and a pin fixing hole 134 shown in FIG. 7b.

The plug 140 includes a plug body 150 corresponding to the plug body 81 in the first embodiment, and a cam constructing member 160 corresponding to the plug cam portion 82. The plug body 150 and the cam constructing member 160 are individual parts. The plug 140 has a construction forming an inserted hole 167 at the plug side, corresponding to the inserted hole 85 of the first embodiment, over the plug body 150 and the cam constructing member 160 as shown in FIG. 10 in fourth embodiment which has almost same constructions to the second embodiment.

The plug body 150 is made of metal material. The plug body 150 includes a plug top portion 151 corresponding to the plug top portion 83 of the first embodiment, and a plug fixing portion 152 corresponding to the plug fixing portion 84 of the first embodiment. The plug top portion 151 and the plug fixing portion 152 are formed by same metal material as a whole. The plug body 150 includes also an accommodating space 153 corresponding to the accommodating space 86 of the first embodiment, and an adjusting bolt hole 154 corresponding to the adjusting bolt hole 83A of the first embodiment.

The cam constructing member 160 is made of metal material. The cam constructing member 160 includes a plug cam portion 161 corresponding to the plug cam portion 82 of the first embodiment, a spring connecting portion 163 corresponding to the spring connecting portion 53 of the first embodiment, and a yoke inserting portion 166. The plug cam portion 161, the spring connecting portion 163 and the yoke inserting portion 166 are formed with same metal material as a whole.

Figure 10:
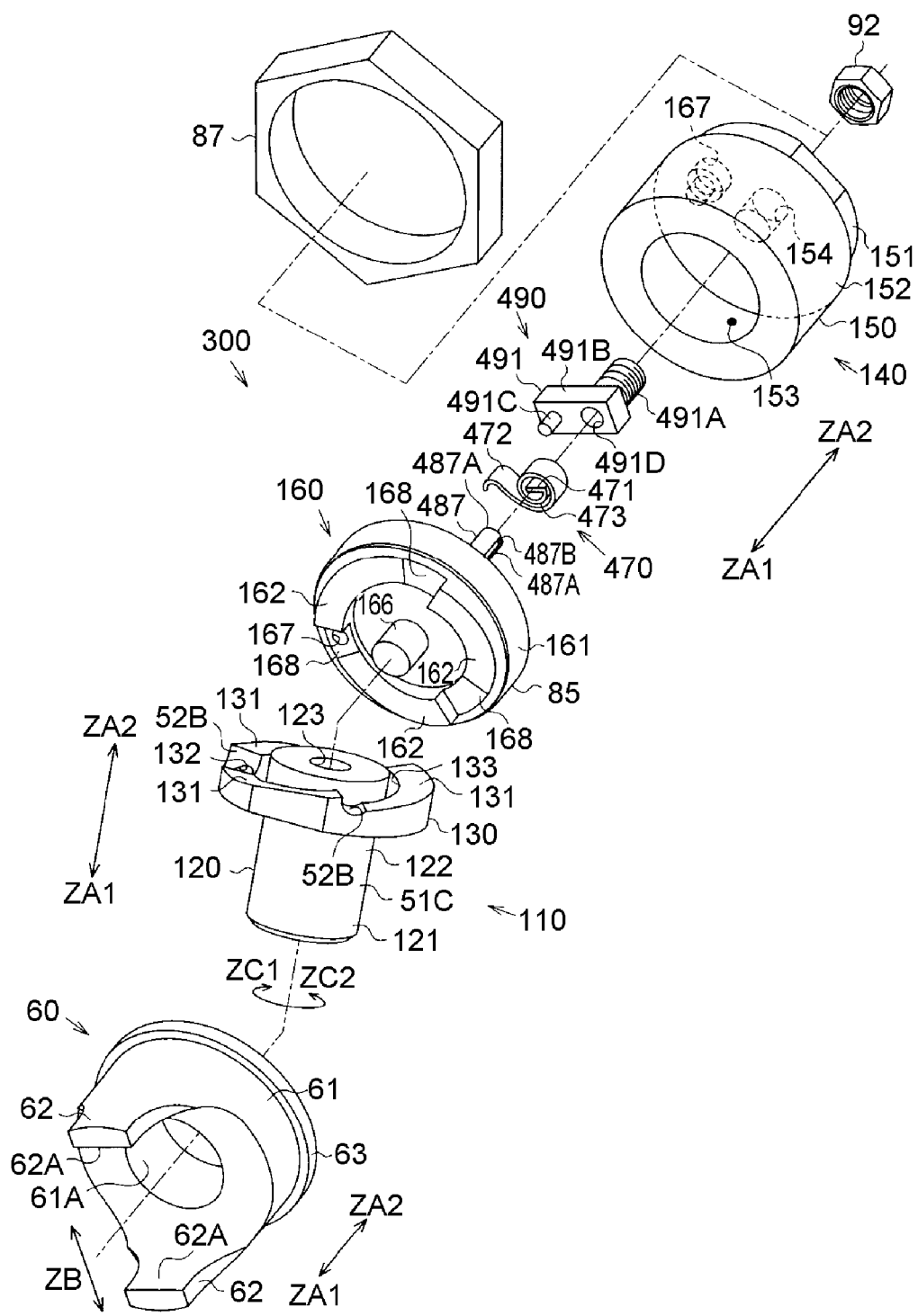
FIG. 10 is a disassembling structural diagram of the rack shaft supporting apparatus of the fourth embodiment.

The plug cam portion 161 includes the plug cam surface 162 corresponding to the plug cam surface 82A of the first embodiment, and a cam intersecting portion 168 corresponding to the cam intersecting portion 82B of the first embodiment as shown in FIG. 10 in fourth embodiment which has almost same constructions to the second embodiment.

The spring connecting portion 163 includes a connecting protrusion portion 164 corresponding to the connecting protrusion portions 53A of the first embodiment, and an attaching groove 165 corresponding to the attaching groove 53B. The spring connecting portion 163 holds the spring end portion 71 by the way that the spring end portion 71 at the yoke side of the torsion spring 70 is pressed into the attaching groove 165.

The yoke inserting portion 166 has a cylindrical shape corresponding to the shape of the inserted hole 123 of the yoke body 120. The yoke inserting portion 166 is formed on an end surface of plug cam portion 161 at a side of the support yoke 110. The inserting portion 166 is inserted into the inserted hole 123 of the yoke body 120 to contact with an inner peripheral surface of the yoke body 120 so that the cam constructing member 160 is placed on same axis to that of the support yoke 110.

The rack shaft supporting device 100 according to the second embodiment has same three adjusting processes to the first to the third adjusting processes of the rack shaft supporting device 40 of the first embodiment.

It is now explained an operation of the rack shaft supporting device 100 according to the second embodiment hereinafter.

In accordance with an increase of the amount of wear, the plug cam surface 162 rotates against the yoke cam surface 131 and the support yoke 110 moves to the pressing direction ZA1 against the plug 140 in transition from the beginning stage of the wear to the progressive stage of the wear of the vehicle steering apparatus 1. As a result, the back surface portion 14C of the rack shaft 14 is still supported by the first yoke end portion 121 even though the wear amount of the friction portion of the rack shaft 14 increases.

The rack shaft supporting device 100 according to the second embodiment has same four functions as the first to the fourth functions of the rack shaft supporting device 40 of the first embodiment.

The vehicle steering apparatus 1 according to the second embodiment has next effect in addition to the effects identified as 1, 3, 4, 5 of the first embodiment.

6. The rack shaft supporting device 100 has the disk spring 107. By this construction, the support yoke 110 is pressed to the plug cam portion 161 by the disk spring 170. As a result, it is difficult for the plug cam surface 162 to be separated from the yoke cam surface 131.

Third Embodiment

Figure 8A:
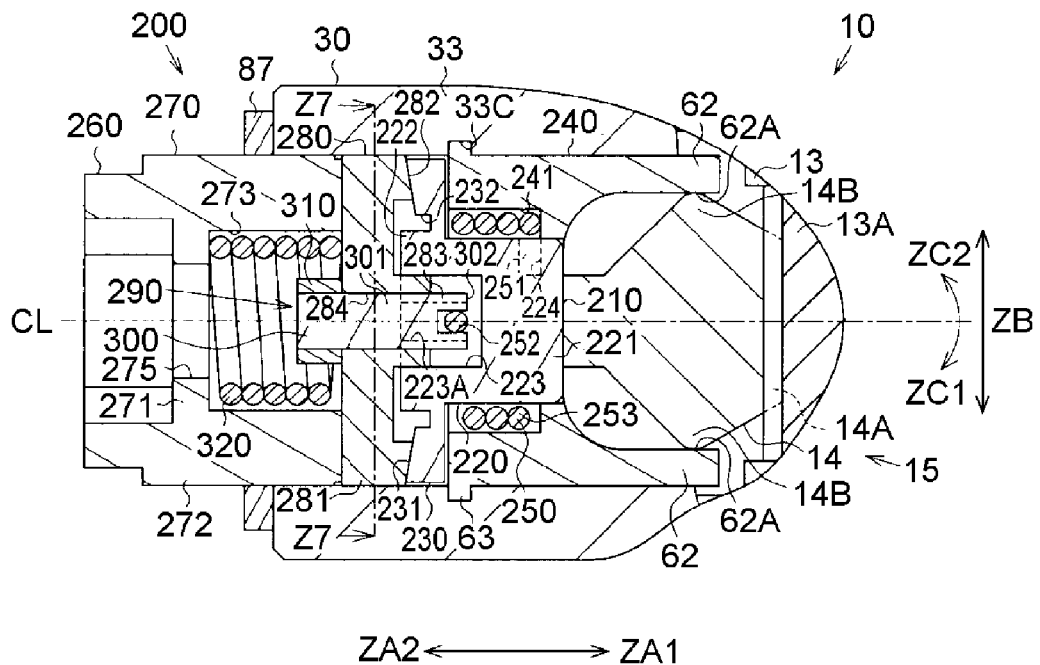
FIG. 8a and FIG. 8b are cross-sectional diagrams of the rack shaft supporting apparatus of the third embodiment.
Figure 8B:
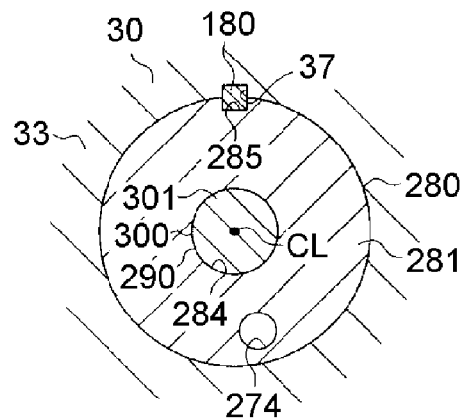

FIG. 8a and FIG. 8b show a rack shaft supporting apparatus 200 of the third embodiment according to the present invention.

The rack shaft supporting apparatus 200 according to the third embodiment has next different constructions compared to the rack shaft supporting apparatus 100 of the second embodiment in FIG. 7a and same constructions to other remaining constructions. The rack shaft supporting apparatus 200 includes a support yoke 210 instead of the support yoke 110, a guide bush 240 instead of the guide bush 60, a torsion spring 250 instead of the torsion spring 70, a plug 260 instead of the plug 140, a spring adjusting mechanism 290 instead of the spring adjusting mechanism 90 and a coil spring as an elastic member 320. Constructional elements defined with explanations of correspondence to constructional elements in the second embodiment have same or similar function to that of the second embodiment.

It is explained here the detail constructions different from that of the rack shaft supporting apparatus 100 of the second embodiment in referring to FIG. 8a. Therefore, a part or all common constructions to the vehicle steering apparatus 1 of the second embodiment are identified by same numeral and are not explained.

The support yoke 210 is made of a metal material. The support yoke 210 has a construction without the pin fixing hole 134 from the support yoke 110 of the second embodiment. The support yoke 210 includes a yoke body 220 and a yoke cam portion 230. The support yoke 210 has a construction formed with the yoke body 220 and the yoke cam portion 230 by the same metal material as a whole.

The yoke body 220 includes a first yoke end portion 221 corresponding to the second yoke end portion 121 in the second embodiment and a second yoke end portion 222 corresponding to the second yoke end portion 122 in the second embodiment, an inserted hole 223, and a spring fixing hole 224.

The yoke cam portion 230 includes a yoke cam surface 231 corresponding to the yoke cam surface 131 in the second embodiment, an un-illustrated cam recess portions corresponding to the un-illustrated cam recess portions in the second embodiment, an un-illustrated inserted hole at a yoke side shown corresponding to the inserted hole 132 at the yoke side in the second embodiment, and an inner peripheral groove 232 corresponding to the inner peripheral groove 133 in the second embodiment.

The guide bush 240 has a construction an accommodating portion 241 in addition to the construction of the guide bush 60 of the first embodiment. The guide bush 240 a torsion spring 250 in the accommodating portion 241.

The plug 260 includes a plug body 270 corresponding to the plug body 150 in the second embodiment, and a cam constructing member 280 corresponding to the cam constructing member 180 in the second embodiment. The plug 260 has a construction forming an inserted hole 274 at the plug side as shown in FIG. 8b over the plug body 270 and the cam constructing member 280.

The plug body 270 is made of metal material. The plug body 270 includes a plug top portion 271, a plug fixing portion 272 corresponding to the plug fixing portion 152 of the first embodiment, an accommodating space 273, the inserted hole 274 shown in FIG. 8b, and a penetrated hole 275. The plug top portion 271 and the plug fixing portion 272 of the plug body 270 are formed by same metal material as a whole.

The cam constructing member 280 is made of metal material. The cam constructing member 280 includes a plug cam portion 281 corresponding to the plug cam portion 161 of the second embodiment, a yoke inserting portion 283 corresponding to the yoke inserting portion 166, an adjusting bolt hole 284, and a pin fixing hole 285 shown in FIG. 8b. The plug cam portion 281 and the yoke inserting portion 283 of the cam constructing member 280 are formed with same metal material as a whole.

The plug cam portion 281 includes a plug cam surface 282 corresponding to the plug cam surface 162 of the second embodiment, and an un-illustrated cam intersecting portion corresponding to the cam intersecting portion 168 of the second embodiment.

A spring adjusting mechanism 290 includes an adjusting bolt 300 corresponding to the adjusting bolt 90 of the second embodiment, and a lock nut 310 corresponding to the lock nut 92 of the second embodiment. The spring adjusting mechanism 290 is fixed to the plug cam portion 281.

The adjusting bolt 300 is made of metal material. The adjusting bolt 300 includes a bolt body 301, and a spring connecting portion 302. The bolt body 301 and the spring connecting portion 302 of the adjusting bolt 300 are formed with same metal material as a whole.

The bolt body 301 includes an un-illustrated male screw corresponding to an un-illustrated female screw of the adjusting bolt hole 284 of the plug 260 and an un-illustrated female screw of the lock nut 310. The bolt body 301 is screwed into the adjusting bolt hole 284.

The torsion spring 250 is accommodated in the accommodating portion 241 of the guide bush 240. The torsion spring 250 includes a spring end portion 251 at a yoke side, a spring end portion 252 at a plug side, and a spring winding portion 253. The torsion spring 250 has a construction that the spring end portion 251 at the yoke side is fixed to the support yoke 210 and the spring end portion 252 at the plug is fixed to the spring connecting portion 302.

An adjustment of the torsion amount of the torsion spring 250 is performed by same method to that of the first embodiment.

The elastic member 320 is made of metal material. The elastic member 320 is accommodated in the accommodating space 273 of the plug 260 in a state that it is compressed by the plug top portion 271 and the cam constructing member 280. The elastic member 320 imparts to the cam constructing member 280 the force acting to the pressing direction ZA1.

The vehicle steering apparatus 1 according to the third embodiment has next effect in addition to the effects identified as 1 to 5 of the first embodiment.

7. The rack shaft supporting device 200 has the elastic member 320. By this construction, the support yoke 210 is pressed to the rack shaft 14 by the elastic member 320. Therefore, it is eliminated to generate the gear beating sound between gears of the rack shaft 14 and the pinion shaft 13.

Fourth Embodiment

Figure 9A:
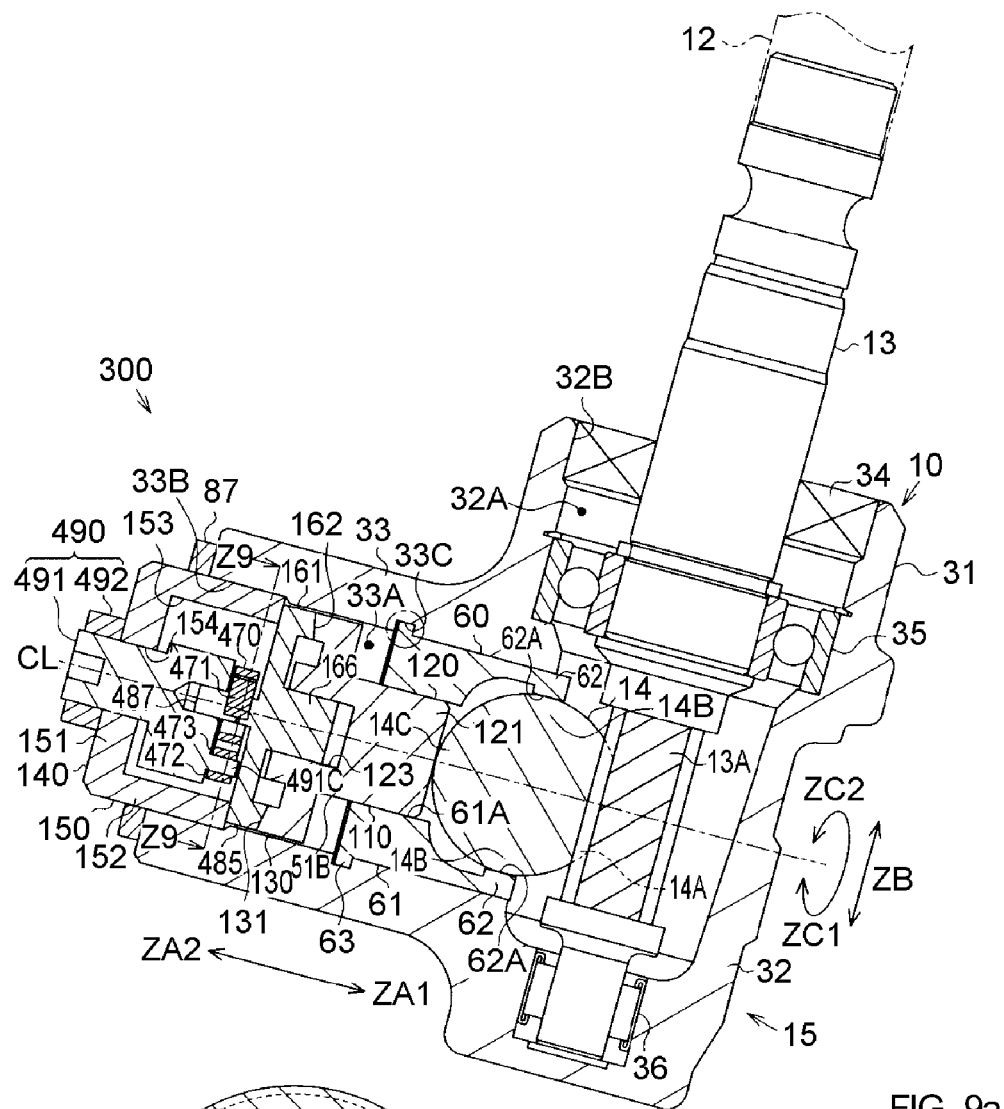
FIG. 9a, FIG. 9b and FIG. 9c are cross-sectional diagrams of the rack shaft supporting apparatus of the fourth embodiment.
Figure 9B:
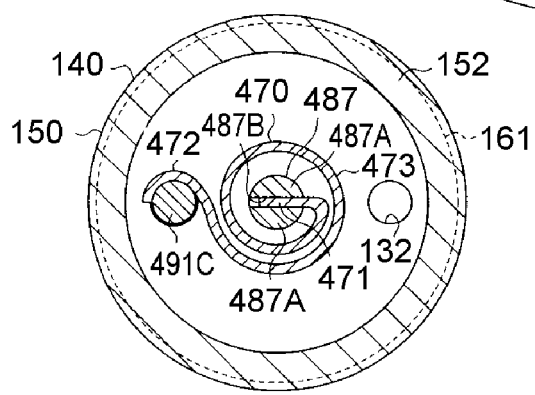
Figure 9C:
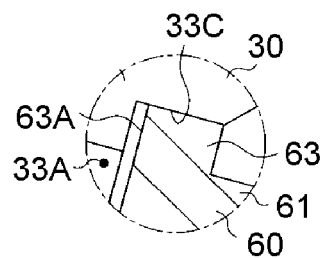

FIG. 9a, FIG. 9b and FIG. 9c show a rack shaft supporting apparatus 300 of the fourth embodiment of the present invention.

The rack shaft supporting apparatus 300 according to the fourth embodiment has next mainly different constructions compared to the rack shaft supporting apparatus 100 of the second embodiment and same constructions to other remaining constructions without being explained here, except that there is not the disk spring 170 of the second embodiment. The main difference of the rack shaft supporting apparatus 300 of the fourth embodiment from the rack shaft supporting apparatus 100 of the second embodiment is to have a spiral spring 470 instead of the torsion spring 70 of the second embodiment and to have no disk spring 170 of the second embodiment.

A spring connecting portion 487 of a cam constructing member 485 includes two connecting protrusion portions 487A and one attaching groove 487B. The spring connecting portion 487 has each of connecting protrusion portions 487A on an end surface of the cam constructing member 485 as shown in FIG. 9b. The spring connecting portion 487 includes the attaching groove 487B between one and the other connecting protrusion portions 487A.

The spiral spring 470 is made by a metal plate. The spiral spring 470 includes first spring end portion 471, second spring end portion 472 and a spring wound portion 473. The spiral spring 470 has a construction forming the first spring end portion 471, the second spring end portion 472 and the spring wound portion 473 by the same metal material as a whole. The spiral spring 470 is pressed in fit to be inserted into the attaching groove 487B of the spring connecting portion 487 at the first spring end portion 471 as shown in FIG. 9b. The spiral spring 470 is hanged on an attaching protrusion 491C at the second spring portion 472 as shown in FIG. 9b. The spiral spring 470 imparts rotational force to rotate the plug cam portion 486 against the yoke cam portion 130.

An adjusting member 491 of a spring adjusting mechanism 490 is made of a metal material. The adjusting member 491 includes a bolt portion 491A, a rotating arm portion 491B, a mounting protrusion 491C and an inserted hole 491D shown in FIG. 10. The adjusting member 491 has a construction forming the bolt portion 491A, the rotating arm portion 491B and the mounting protrusion 491C by the same metal material as a whole. The adjusting member 491 accommodates a part of the connecting protrusion portion 487A of the cam constructing member 485 at a side of the counter pressing direction ZA2 at the inserted hole 491D. The adjusting member 491 adjusts a torsion amount of the spiral spring 470.

The rack shaft supporting device 300 of the fourth embodiment has same three adjusting processes to the first to the third adjusting processes of the rack shaft supporting device 100 of the second embodiment.

The rack shaft supporting device 300 of the fourth embodiment has same four functions to the first to the fourth functions of the rack shaft supporting device 100 of the second embodiment.

The vehicle steering apparatus 1 according to the fourth embodiment has same effects to that identified as 1, 3, 4, 5 of the first embodiment.

Fifth Embodiment

Figures 11A, 11B:
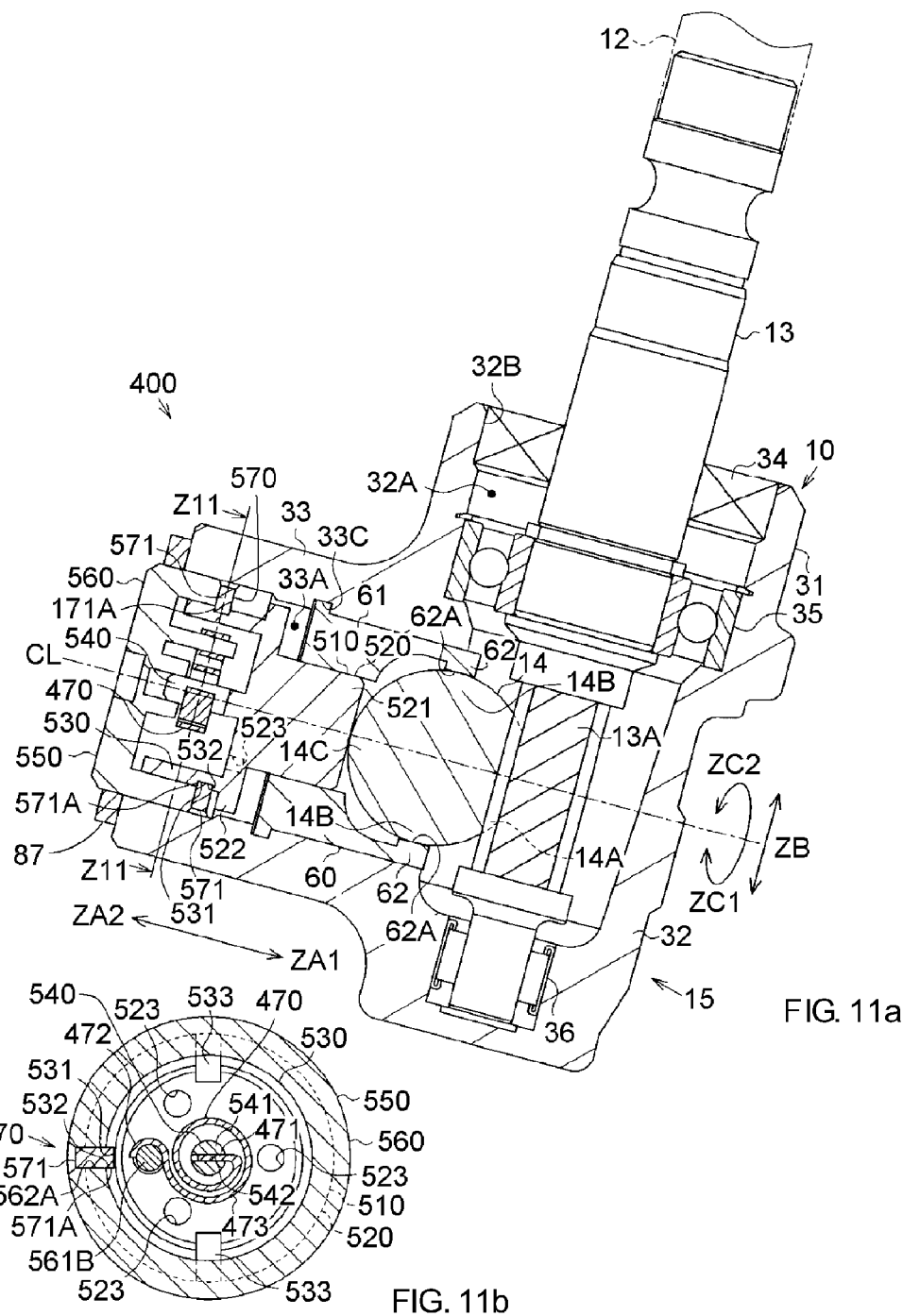
FIG. 11a and FIG. 11b are cross-sectional diagrams of the rack shaft supporting apparatus of the fifth embodiment.

FIG. 11a and FIG. 11b show a rack shaft supporting apparatus 400 of the fifth embodiment according to the present invention.

The rack shaft supporting apparatus 400 according to the fifth embodiment has next mainly different constructions compared to the rack shaft supporting apparatus 300 of the fourth embodiment and same constructions to other remaining constructions without being explained here. The main difference of the rack shaft supporting apparatus 400 of the fifth embodiment from the rack shaft supporting apparatus 300 of the fourth embodiment is to have a different type of cam mechanism instead of the cam mechanism of the fourth embodiment and not to have the spring adjusting mechanism 490 of the fourth embodiment. The rack shaft supporting apparatus 400 includes a support yoke 510 instead of the support yoke 110 and a plug 550 instead of the plug 140. Constructional elements defined with explanations of correspondence to constructional elements in the fourth embodiment have same or similar function to that of the fourth embodiment.

Figure 12:
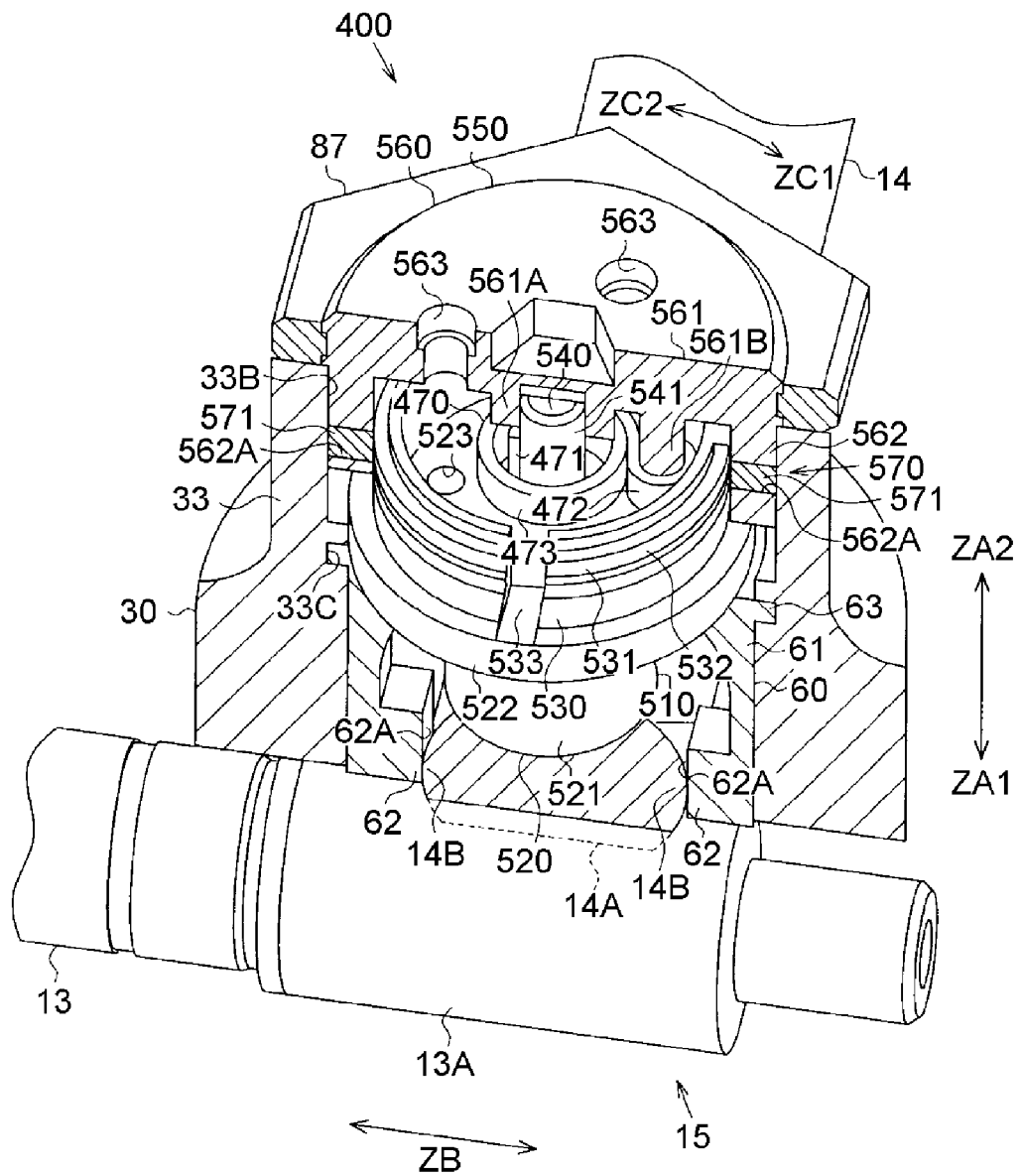
FIG. 12 is a cross-sectional diagram of the rack shaft supporting apparatus of the fifth embodiment, and a partially cross-sectioned diagram showing a cross-sectional construction at a plane parallel to a central axis of the pinion shaft and transverse to a central axis of the rack shaft.
Figure 13:
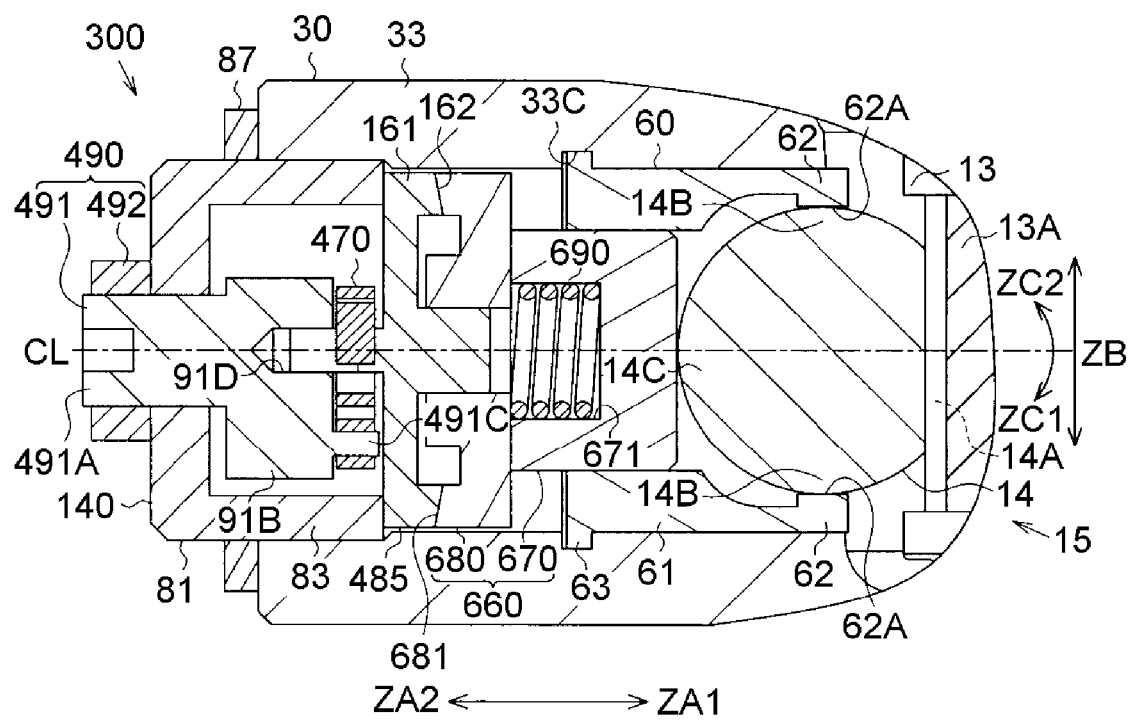
FIG. 13 is a cross-sectional diagram of the rack shaft supporting apparatus of the other embodiment, and a cross-sectional diagram showing a cross-sectional construction at a plane parallel to a central axis of the pinion shaft and transverse to a central axis of the rack shaft.

It is explained here the detail constructions different from that of the rack shaft supporting apparatus 400 of the fourth embodiment in referring to FIG. 11*a*, FIG. 11*b* and FIG. 12. Therefore, a part or all common constructions to the vehicle steering apparatus 300 of the fourth embodiment are not explained.

In referring to FIG. 11*a*, it is explained hereinafter the support yoke 510 mainly.

The support yoke 510 is made of a metal material. The support yoke 510 includes a construction without the inserted hole 123 from the support yoke 110 of the fourth embodiment. The support yoke 510 has a yoke body 520, a yoke cam portion 530 and a spring connecting portion 540. The support yoke 510 is a construction forming the yoke body 520, the yoke cam portion 530 and the spring connecting portion 540 by the same metal material as a whole.

The yoke body 520 includes a first yoke end portion 521 corresponding to the first yoke end portion 121 of the fourth embodiment and a second yoke end portion 522 corresponding to the second yoke end portion 122 of the fourth embodiment. The yoke body 520 has three of inserted holes 523 in a yoke side on the second yoke end portion 522 as shown in FIG. 11*b*.

The yoke cam portion 530 has an annular cylindrical column shape around the center line CL. The yoke cam portion 530 is protruded to the counter pressing direction ZA2 from an end surface of the yoke body 520 at a side of the counter pressing direction ZA2. The yoke cam portion 530 includes a cam groove 531 and two pin inserting grooves 533 as shown in FIG. 11*b*.

The cam groove 531 is formed on an outer peripheral surface of the yoke cam portion 530. The cam groove 531 is a spiral groove inclined to the pressing direction ZA1 in accordance with approaching to the rotating direction ZC1. The cam groove 531 includes a yoke cam surface 532 inside.

The two pin inserting grooves 533 are respectively penetrated into the yoke cam portion 530 along a transverse direction to the center line CL as shown in FIG. 11*b*. The pin inserting grooves 533 are positioned at faced portions each other at the yoke cam portion 530 as shown in FIG. 11*b*. The pin inserting grooves 533 are communicated with the cam groove 531 as shown in FIG. 12.

The spring connecting portion 540 has a cylindrical shape. The spring connecting portion 540 has a coaxial axis to the center line CL. The spring connecting portion 540 is protruded to the counter pressing direction ZA2 from an end surface of the yoke body 520 at a side of the counter pressing direction ZA2. The spring connecting portion 540 includes two connecting protrusion portions 541 and one attaching groove 542 as shown in FIG. 11*b*. The spring connecting portion 540 has the attaching groove 542 between one and the other connecting protrusion portions 541.

In referring to FIG. 12, it is explained hereinafter the plug 550 mainly.

The plug 550 includes a plug body 560, a plug cam portion 570 and the plug lock nut 87. The plug 550 is fixed to the yoke accommodating portion 33. The plug 550 closes the opening portion 33B of the yoke accommodating portion 33.

The plug body 560 has a construction having no adjusting bolt hole 154 of the plug body 154 of the fourth embodiment. The plug body 560 includes a plug top portion 561 corresponding to the plug top portion 151, a plug fixing portion 562 corresponding to the plug fixing portion 152 and three inserting holes 563 at a plug side corresponding to the inserting hole at the plug side of the fourth embodiment.

The plug top portion 561 includes an inserting portion 561A and an attaching protrusion 561B. The inserting portion 561A has same coaxial axis to the center line CL. The inserting portion 561A has a circumferential wall protruding to the pressing direction ZA1 from the end surface of the plug top portion 561 at a side of pressing direction ZA1. The inserting portion 561A contacts with an outer peripheral surface of the connecting protrusion portion 541 of the support yoke 510 at an inner peripheral surface of the inserting portion 561A.

The attaching protrusion 561B has a cylindrical shape. The attaching protrusion 561B is positioned between the inserting portion 561A and the yoke cam portion 530. The attaching protrusion 561B protrudes to the pressing direction ZA1 from the end surface of the plug top portion 561 at a side of pressing direction ZA1.

The plug fixing portion 562 has a cylindrical shape. The plug fixing portion 562 faces to the outer peripheral surface of the yoke cam portion 530. The plug fixing portion 562 has two pin fixing holes 562A.

The plug cam portion 570 includes a cam pin 571. The plug cam portion 570 presses the yoke cam portion 530 to the pressing direction ZA1 by contacting with the yoke cam portion 530 at the cam pin 571 pressed in fit into the pin fixing hole 562A of the plug fixing portion 530.

The cam pin 571 is made of a metal material. The cam pin 571 has a cylindrical shape. The cam pin 571 includes a plug cam surface 571A shown in FIG. 11*a*. The cam pin 571 contacts with the yoke cam surface 532 at the plug cam surface 571A as shown in FIG. 11*a*.

The first spring end portion 471 of the spiral spring 470 is pressed in fit into the attaching groove 542 of the spring connecting portion 540 as shown in FIG. 11*b*. The second spring end portion 472 of the spiral spring 470 is hanged on the attaching protrusion 561B as shown in FIG. 11*b*. The spiral spring 470 imparts to the support yoke 510 the force rotating the yoke cam portion 530 against the plug cam portion 570.

It is explained here an operation of adjusting the torsion amount of the spiral spring 470 of the fifth embodiment in referring to FIG. 12.

An operator assembles the rack shaft supporting apparatus 400 (referred as a "second pre-adjusted unit") in a process prior to an adjusting process of the torsion amount. The stage of the second pre-adjusted unit is assembled with parts except for the guide bush 60 and the plug lock nut 87. The operator inserts the cam pin 571 into the pin inserting groove 533 in assembling the support yoke 510 to the plug 550 at the second pre-adjusted unit assembling.

In first adjusting process, the operator moves the predetermined inserted hole 563 at the plug side of the plug 550 to the coaxial axis with the inserted hole 523 of the support yoke 510 at the predetermined yoke side by rotating the plug 550 to the counter rotating direction ZC2. The cam pin 571 moves into the cam groove 531 through the pin inserting groove 533. The plug 550 winds the spiral spring 470 by rotating the second spring end portion 472 of the spiral spring 470 in a state that the rotation of the support yoke 510 against the plug 550 is restricted.

In second adjusting process, the operator inserts an un-illustrated temporary lock bolt into the inserted hole 563 at the plug side and the inserted hole 523 at the yoke side being in coaxial axis each other. The temporary lock bolt locks the relative rotational phase of the plug 550 and the yoke support 510.

In third adjusting process, the operator fixes the plug body 560 to the housing 30. The operator then screws the plug lock nut 87 into the plug body 560. Besides, the temporary lock bolt is removed from the plug 550 and the support yoke 510 after locking the plug 550 against the housing 30. The opening portion of the inserted hole 563 at the plug side is sealed by an un-illustrated plug member after removing the temporary lock bolt.

The rack shaft supporting apparatus 100 according to the fifth embodiment has same effects to that identified as 1, 2, 3, 4, 5 of the first embodiment.

While the invention has been described in detail with reference to the preferred embodiments, it will be apparent to those skilled in the art that the invention is not limited to the present embodiments, and that the invention may be realized in various other embodiments within the scope of the claims.

While the rack shaft supporting device 40 of the steering apparatus 1 according to the first embodiment does not have the disk spring 170 shown in FIG. 7a, however it may equips with the disk spring 170 in the rack shaft supporting device 40 of the steering apparatus 1 in the first embodiment.

While the rack shaft supporting device 40 of the steering apparatus 1 according to the first embodiment does not have the elastic member 320 shown in FIG. 8a, however it may equips with the elastic member 320 in the rack shaft supporting device 40 of the steering apparatus 1 in the first embodiment.

While the rack shaft supporting device 40 of the steering apparatus 1 according to the first embodiment has three yoke cam surfaces 52A and three plug cam surfaces 82A, however it may equips with one, two or four yoke cam surfaces 52A and same number of plug cam surfaces 82A in first embodiment, also same constructions in second, third, fourth or fifth embodiment.

While the rack shaft supporting device 40 of the steering apparatus 1 according to the first embodiment has support yoke 50 equipping the yoke body 51 with the yoke cam portion 52 constructed by same material as a whole, however it may equips the yoke body 51 and the yoke cam portion 52 constructed by separate parts. It may equip same construction in the rack shaft supporting device 100, 200 in second, third or fourth embodiment.

It may also further equip an elastic member between individual separate parts of the yoke body 51 and the yoke cam portion 52 of the first embodiment. The elastic member may be inserted at a side surface of the yoke body 51 at the counter pressing direction ZA2. The elastic member may be a disk spring, an O-ring or a coil spring. The yoke cam portion 52 may contacts with a portion of the elastic member at a side of the counter pressing direction ZA2. In other words, the yoke body 51 and the yoke cam portion 52 are separated each other by the elastic material. The elastic member has a function absorbing any vibration of the rack shaft 14 by any counter force from the steered wheels 3 to the rack shaft 14. These constructions may be equipped to the rack shaft supporting device in second, third, fourth or fifth embodiment.

While the rack shaft supporting apparatus 40 of the first embodiment has the support yoke 50 including the first yoke end portion 51A with a flat surface, however it may construct the support yoke 50 including the first yoke end portion 51A with a spherical surface protruded to the back surface portion 14C of the rack shaft 14. By this construction, it can reduce any wear between the support yoke 50 and the rack shaft 14. These constructions may be equipped to the rack shaft supporting device in second, third, fourth or fifth embodiment.

While the rack shaft supporting apparatus 40 of the first embodiment has the guide bush 60 with the bush body 61 and each arm portion 62 of the same material as a whole, however it may have the guide bush 60 with the bush body 61 and each arm portion 62 of separate parts respectively. These constructions may be equipped to the rack shaft supporting device in second, third, fourth or fifth embodiment.

While the rack shaft supporting apparatus 40 of the first embodiment has the guide bush 60 with two arm portions 62 formed as a whole, however it may have the guide bush 60 one single arm portion 62 without other arm portion 62. Only one single arm portion 62 supports one side portion 14B of the rack shaft 14. As a result, this construction reduce also the movement amount of the rack shaft 14 to the rack width direction ZB in comparison with the construction without supporting both of side portions 14B of the rack shaft. These constructions may be equipped to the rack shaft supporting device in second, third, fourth or fifth embodiment.

While the rack shaft supporting apparatus 40 of the first embodiment has the bush body 61 accommodated directly in the yoke accommodating portion 33, however it may have an un-contacting member on a peripheral surface of the bush body 61 with the yoke accommodating portion 33. The un-contacting member may be an O-ring as an elastic material pressed into a groove formed on the outer peripheral surface of the bush body 61. These constructions may be equipped to the rack shaft supporting device in second, third, fourth or fifth embodiment.

While the rack shaft supporting apparatus 40 of the first embodiment has the spring end portion 71 at the yoke side and the spring end portion 72 at the plug side of the torsion spring 70 inserted into the corresponding parts respectively, however it may have only one of the spring end portion 71 at the yoke side and the spring end portion 72 at the plug side inserted into the corresponding part and the remaining other spring end portion 71 or 72 being movable against the corresponding other part. These constructions may be equipped to the rack shaft supporting device in second or third embodiment.

Figure 1:
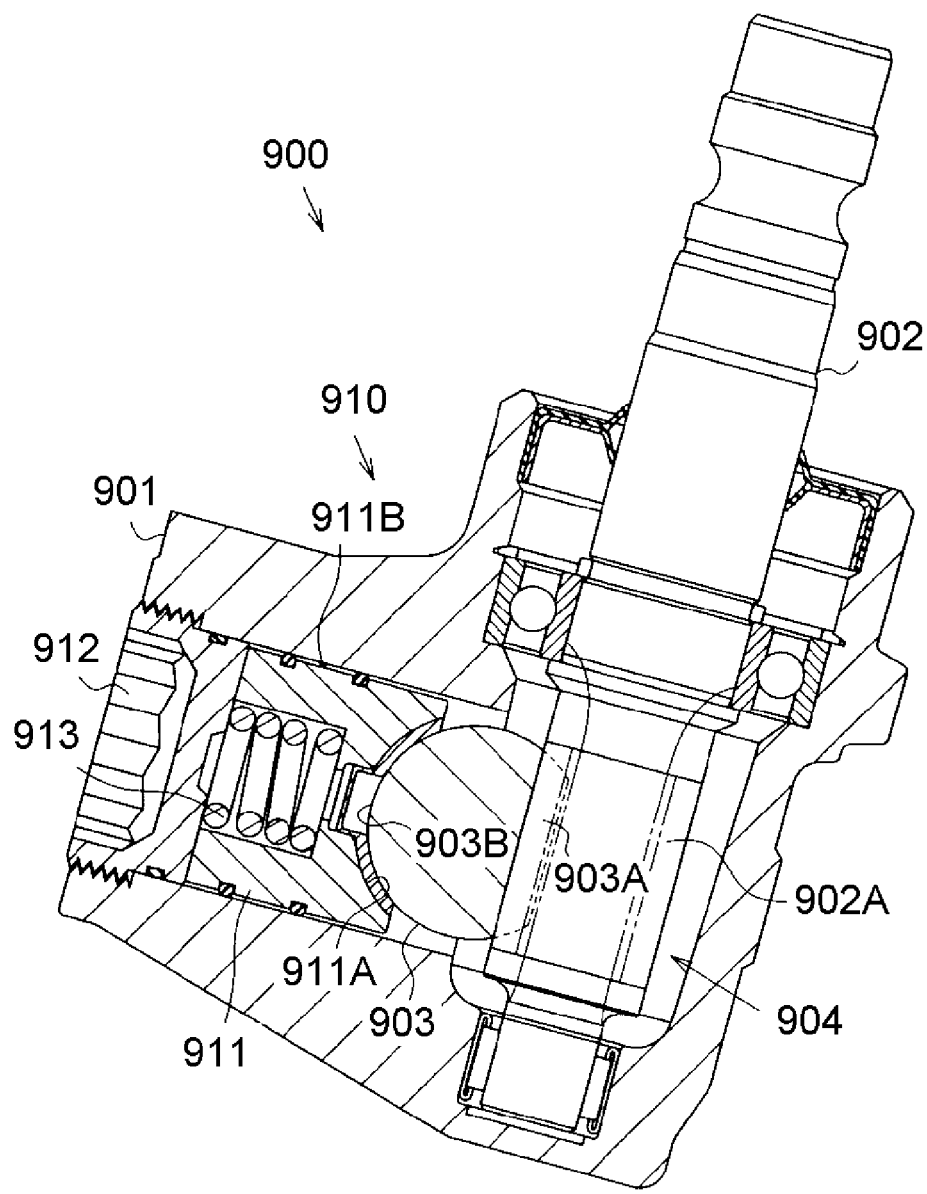
FIG. 1 is a cross-sectional diagram of the rack shaft supporting apparatus of the prior art and the cross-sectional diagram showing a sectional construction at a plane parallel to a central axis of the pinion shaft and transverse to a central axis of the rack shaft.

While the rack shaft supporting apparatus 40 of the first embodiment has each arm portion 62 of the guide bush 60 contacting with each side portion 14B of the rack shaft 14, however it may have possible clearance between each arm portion 62 and each side portion 14B. An amount of the clearance is limited within small moving amount of the rack shaft 14 along the rack width direction ZB comparing to rack shaft 903 of the prior art of the rack shaft supporting apparatus 910 without any guide bush as shown in FIG. 1. These constructions may be equipped to the rack shaft supporting device in second, third, fourth or fifth embodiment.

While the rack shaft supporting apparatus 40 of the first embodiment has the restricting mechanism restricting the movement of the guide bush 60 against the housing 30 along the direction of the center line CL by pressing in fit the flange 63 of the bush body 61 into the groove portion 33C of the yoke accommodating portion 33, however it may have other restricting mechanism formed on the inner peripheral surface of the yoke accommodating portion 33 instead of the groove 33C, and a stop ring fixed on the inner peripheral surface of the yoke accommodating portion 33. The last-mentioned restricting mechanism and the stop ring sandwich the flange 63 along the direction of the center line CL. Therefore, the movement of the housing 30 against the guide bush 60, 240 are restricted by the last mentioned restricting mechanism and the stop ring. These constructions may be equipped to the rack shaft supporting device in second, third, fourth or fifth embodiment.

While the rack shaft supporting apparatus 100 of the second embodiment has the disk spring 170 pressing the yoke cam surface 131 to the plug cam surface 162, however it may have an O-ring instead of the disk spring 170.

While the rack shaft supporting apparatus 100 of the second embodiment has the disk spring 170, however it may not have the disk spring 170.

While the rack shaft supporting apparatus 100 of the second embodiment has the detent pin 180, however it may not have the detent pin 180. This construction may be equipped to the rack shaft supporting device 200 of third embodiment.

While the rack shaft supporting apparatus 200 of the third embodiment has the elastic member 320, however it may not have the elastic member 320.

While the rack shaft supporting apparatus 300 of the fourth embodiment has the spiral spring 470 mainly instead of the torsion spring 70 of the second embodiment, however the rack shaft supporting apparatus 300 of the fourth embodiment may have the torsion spring 70 instead of the spiral spring 470.

While the rack shaft supporting apparatus 300 of the fourth embodiment has not a construction of an elastic member pressing the yoke cam portion 130 to the cam constructing member 485, however it may have an elastic member 690 of a coil spring, and a support yoke 660 instead of the support yoke 50 shown in FIG. 4. The support yoke 660 includes a yoke body 670 corresponding to the yoke body 51 of the fourth embodiment and a yoke cam portion 680 corresponding to the yoke cam portion 52 as a separate individual part.

The yoke body 670 includes a spring accommodating hole 671. The yoke cam portion 680 includes a yoke cam surface 681 corresponding to the yoke cam surface 52A. The elastic member 690 is accommodated in a state being compressed by the yoke body 670 and the yoke cam portion 680. The elastic member 690 presses the yoke body 670 to the pressing direction ZA1 and the yoke cam portion 680 to the counter pressing direction ZA2.

By these constructions, the rack shaft supporting apparatus 300 has minimum gear beating sound between gears of the rack shaft 14 and the pinion shaft 13 because the yoke body 670 is pressed to the rack shaft 14 by the elastic member 690. And also since the yoke cam portion 680 is pressed to the plug cam portion 161 by the elastic member 690, it is not to separate the yoke cam surface 681 from the plug cam surface 162. While the apparatus has the coil spring for the elastic member 690, however it may have an O-ring or other elastic material for the elastic member 690.

While the rack shaft supporting apparatus 400 of the fifth embodiment has the cam groove 531 in the support yoke 510 and the cam pin 571 in the plug 550, however it may have a cam pin in the support yoke 510 and a cam groove in the plug 550.

While the vehicle steering apparatus 1 of the first to fifth embodiment has the rack shaft 14 having similar sectional figure to a Y letter in its transverse plane to the center axis direction, however it may have a D-shaped rack shaft having similar sectional figure to a D letter in its transverse plane to the center axis direction. A side portion of the D-shaped rack shaft is supported by each of the arm portions 62 of the guide bush 60 or 240. The side portion of the D-shaped rack shaft includes a portion having a maximum distance from the center axis on the transverse plane to the center axis.

While the vehicle steering apparatus 1 of the first to fifth embodiment has the assisting device 20, however it may not have the assisting device 20.

While the vehicle steering apparatus 1 of the first to fifth embodiment has the column assisted steering apparatus, however it may have a pinion assisted, a dual pinion assisted, a co-axial rack assisted or a parallel rack assisted steering apparatus.

What is claimed is:

1. A rack shaft supporting apparatus comprising;
   a housing accommodating a rack shaft;
   a plug including a plug fixing portion fixed to said housing and a plug cam portion formed with a plug cam surface;
   a support yoke including a yoke body supporting a back surface portion of said rack shaft and a yoke cam portion formed with a yoke cam surface having a shape corresponding to a shape of said plug cam surface, said yoke cam surface is in contact with said plug cam surface;
   a spring member imparting force to rotate one of said yoke cam portion and said plug cam portion in relative to the other of said yoke cam portion and said plug cam portion, said force is imparted to one of said support yoke and said plug cam portion; and
   a guide bush mounted on said housing to support a side portion of said rack shaft, wherein said guide bush includes at least two arm portions supporting said side portions of said rack shaft along a width direction of said rack shaft, one of said two arm portions supports one of said side portions of said rack shaft, and the other of said two arm portions supports the other of said side portions of said rack shaft, and wherein
   said guide bush includes a bush body integrally formed as a whole with said two arm portions;
   said bush body includes an insertion hole having a shape corresponding to a shape of said support yoke; and
   at least a part of said support yoke is inserted into said insertion hole.

2. A rack shaft supporting apparatus according to claim 1, wherein said rack shaft supporting apparatus includes an elastic member pushing said support yoke to said rack shaft.

3. A rack shaft supporting apparatus comprising;
   a housing accommodating a rack shaft;
   a plug including a plug fixing portion fixed to said housing and a plug cam portion formed with a plug cam surface;
   a support yoke including a yoke body supporting a back surface portion of said rack shaft and a yoke cam portion formed with a yoke cam surface having a shape corresponding to a shape of said plug cam surface, said yoke cam surface is in contact with said plug cam surface;
   a torsion spring imparting force to rotate one of said yoke cam portion and said plug cam portion in relative to the other of said yoke cam portion and said plug cam portion, said force is imparted to one of said support yoke and said plug cam portion; and
   a guide bush mounted on said housing to support a side portion of said rack shaft, wherein said guide bush includes at least two arm portions supporting said side portions of said rack shaft along a width direction of said rack shaft, one of said two arm portions supports one of said side portions of said rack shaft, and the other of said two arm portions supports the other of said side portions of said rack shaft, and wherein
   said guide bush includes a bush body integrally formed as a whole with said two arm portions;
   said bush body includes an insertion hole having a shape corresponding to a shape of said support yoke; and
   at least a part of said support yoke is inserted into said insertion hole.

4. A rack shaft supporting apparatus comprising;
   a housing accommodating a rack shaft;
   a plug including a plug fixing portion fixed to said housing and a plug cam portion formed with a plug cam surface;
   a support yoke including a yoke body supporting a back surface portion of said rack shaft and a yoke cam portion formed with a yoke cam surface having a shape corresponding to a shape of said plug cam surface, said yoke cam surface is in contact with said plug cam surface;

a torsion spring imparting force to rotate said yoke cam portion against said plug cam portion, said force is imparted to said support yoke; and a guide bush mounted on said housing to support a side portion of said rack shaft, wherein said guide bush includes at least two arm portions supporting said side portions of said rack shaft along a width direction of said rack shaft, one of said two arm portions supports one of said side portions of said rack shaft, and the other of said two arm portions supports the other of said side portions of said rack shaft, and wherein said guide bush includes a bush body integrally formed as a whole with said two arm portions;

said bush body includes an insertion hole having a shape corresponding to a shape of said support yoke; and at least a part of said support yoke is inserted into said insertion hole.

5. A rack shaft supporting apparatus comprising;

a housing accommodating a rack shaft;

a plug including a plug fixing portion fixed to said housing and a plug cam portion formed with a plug cam surface, said plug cam portion is rotatable against said plug fixing portion;

a support yoke including a yoke body supporting a back surface portion of said rack shaft and a yoke cam portion formed with a yoke cam surface having a shape corresponding to a shape of said plug cam surface, said yoke cam surface is in contact with said plug cam surface;

a torsion spring imparting force to rotate said plug cam portion against said yoke cam portion, said force is imparted to said plug cam portion; and a guide bush mounted on said housing to support a side portion of said rack shaft, wherein said guide bush includes at least two arm portions supporting said side portions of said rack shaft along a width direction of said rack shaft, one of said two arm portions supports one of said side portions of said rack shaft, and the other of said two arm portions supports the other of said side portions of said rack shaft, and wherein said guide bush includes a bush body integrally formed as a whole with said two arm portions;

said bush body includes an insertion hole having a shape corresponding to a shape of said support yoke; and at least a part of said support yoke is inserted into said insertion hole.

6. A rack shaft supporting apparatus according to claim 5, wherein said rack shaft supporting apparatus includes an elastic member pushing said support yoke to said rack shaft.

7. A vehicle steering apparatus comprising;

said rack shaft;

said housing; and said rack shaft supporting apparatus according to claim 5.

8. A rack shaft supporting apparatus comprising;

a housing accommodating a rack shaft;

a plug including a plug fixing portion fixed to said housing and a plug cam portion formed with a plug cam surface, said plug cam portion is rotatable against said plug fixing portion;

a support yoke including a yoke body supporting a back surface portion of said rack shaft and a yoke cam portion formed with a yoke cam surface having a shape corresponding to a shape of said plug cam surface, said yoke cam surface is in contact with said plug cam surface;

a spiral spring imparting force to rotate said plug cam portion against said yoke cam portion, said force is imparted to said plug cam portion; and a guide bush mounted on said housing to support a side portion of said rack shaft, wherein said guide bush includes at least two arm portions supporting said side portions of said rack shaft along a width direction of said rack shaft, one of said two arm portions supports one of said side portions of said rack shaft, and the other of said two arm portions supports the other of said side portions of said rack shaft, and wherein said guide bush includes a bush body integrally formed as a whole with said two arm portions;

said bush body includes an insertion hole having a shape corresponding to a shape of said support yoke; and at least a part of said support yoke is inserted into said insertion hole.

9. A rack shaft supporting apparatus comprising;

a housing accommodating a rack shaft;

a plug including a plug fixing portion fixed to said housing and a plug cam portion formed with a plug cam surface;

a support yoke including a yoke body supporting a back surface portion of said rack shaft and a yoke cam portion formed with a yoke cam surface having a shape corresponding to a shape of said plug cam surface, said yoke cam surface is in contact with said plug cam surface;

a spiral spring imparting force to rotate said yoke cam portion against said plug cam portion, said force is imparted to said support yoke; and a guide bush mounted on said housing to support a side portion of said rack shaft, wherein said guide bush includes at least two arm portions supporting said side portions of said rack shaft along a width direction of said rack shaft, one of said two arm portions supports one of said side portions of said rack shaft, and the other of said two arm portions supports the other of said side portions of said rack shaft, and wherein said guide bush includes a bush body integrally formed as a whole with said two arm portions;

said bush body includes an insertion hole having a shape corresponding to a shape of said support yoke; and at least a part of said support yoke is inserted into said insertion hole.

10. A rack shaft supporting apparatus according to claim 9, wherein said rack shaft supporting apparatus includes an elastic member pushing said support yoke to said rack shaft.

11. A vehicle steering apparatus comprising;

said rack shaft;

said housing; and said rack shaft supporting apparatus according to claim 9.

* * * * *